United States Patent
Ito et al.

(10) Patent No.: US 11,450,869 B2
(45) Date of Patent: Sep. 20, 2022

(54) FUEL CELL SYSTEM

(71) Applicant: TOYOTA JIDOSHA KABUSHIKI KAISHA, Toyota (JP)

(72) Inventors: Masayuki Ito, Sunto-gun (JP);
Hideyuki Kumei, Sunto-gun (JP);
Tomohiko Kaneko, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 152 days.

(21) Appl. No.: 16/694,126

(22) Filed: Nov. 25, 2019

(65) Prior Publication Data

US 2020/0185739 A1   Jun. 11, 2020

(30) Foreign Application Priority Data

Dec. 6, 2018   (JP) .............................. JP2018-229236

(51) Int. Cl.
*H01M 8/04119* (2016.01)
*H01M 8/2484* (2016.01)
(Continued)

(52) U.S. Cl.
CPC ....... *H01M 8/04179* (2013.01); *H01M 8/249* (2013.01); *H01M 8/2484* (2016.02);
(Continued)

(58) Field of Classification Search
CPC ......... H01M 8/04156; H01M 8/04179; H01M 8/04223; H01M 8/04225; H01M 8/04302;
(Continued)

(56) References Cited

U.S. PATENT DOCUMENTS

2007/0111061 A1*  5/2007  Matsuno ............... H01M 8/249
                                                         429/432
2009/0142633 A1*  6/2009  Kizaki ............ H01M 8/04492
                                                         429/413
(Continued)

FOREIGN PATENT DOCUMENTS

JP     2004-311277 A     11/2004
JP     2005-276529       10/2005
(Continued)

*Primary Examiner* — Ula C Ruddock
*Assistant Examiner* — Matthew W Van Oudenaren
(74) *Attorney, Agent, or Firm* — Finnegan, Henderson, Farabow, Garrett & Dunner, LLP

(57) ABSTRACT

A fuel cell system includes a first fuel cell stack having a discharge manifold, a second fuel cell stack having a discharge manifold, a first auxiliary machine used for power generation of the first fuel cell stack, a second auxiliary machine used for power generation of the second fuel cell stack, and a controller configured to control operation of the first auxiliary machine and the second auxiliary machine. The controller is configured to control operation of the first auxiliary machine and the second auxiliary machine, such that one of the first fuel cell stack and the second fuel cell stack, of which a discharge direction of reaction gas discharged from the discharge manifold forms a smaller angle with a vertical downward direction, starts generating power earlier than the other fuel cell stack, after power generation of the first fuel cell stack and the second fuel cell stack is stopped.

13 Claims, 13 Drawing Sheets

(51) Int. Cl.
*H01M 8/249* (2016.01)
*H01M 8/04223* (2016.01)
*H01M 8/04701* (2016.01)
*B60L 50/72* (2019.01)
*H01M 8/0432* (2016.01)
*H01M 8/04302* (2016.01)
*H01M 8/04955* (2016.01)
*H01M 8/04746* (2016.01)
*H01M 8/04303* (2016.01)
*H01M 8/04225* (2016.01)
*H01M 8/04228* (2016.01)
*B60L 58/31* (2019.01)

(52) U.S. Cl.
CPC .............. *B60L 50/72* (2019.02); *B60L 58/31* (2019.02); *H01M 8/0432* (2013.01); *H01M 8/04156* (2013.01); *H01M 8/04223* (2013.01); *H01M 8/04225* (2016.02); *H01M 8/04228* (2016.02); *H01M 8/04231* (2013.01); *H01M 8/04253* (2013.01); *H01M 8/04268* (2013.01); *H01M 8/04302* (2016.02); *H01M 8/04303* (2016.02); *H01M 8/04701* (2013.01); *H01M 8/04776* (2013.01); *H01M 8/04955* (2013.01); *H01M 2250/20* (2013.01)

(58) Field of Classification Search
CPC .............. H01M 8/249; H01M 8/2484; H01M 8/04701; H01M 8/04776; H01M 8/04955; H01M 8/0432; H01M 8/04228; H01M 8/04231; H01M 8/04268; H01M 8/04303; H01M 8/04253; H01M 2250/20; B60L 50/72

See application file for complete search history.

(56) References Cited

U.S. PATENT DOCUMENTS

2010/0065359 A1\* 3/2010 Jufuku ................ H01M 8/2485
                                                                180/68.5
2010/0266911 A1\* 10/2010 Aso .................. H01M 8/04179
                                                                429/427
2016/0141655 A1\* 5/2016 Naganuma .............. B60L 50/71
                                                                429/414

FOREIGN PATENT DOCUMENTS

| JP | 2007-087739 | | 4/2007 |
| JP | 2008-510271 | A | 4/2008 |
| JP | 2009-134907 | | 6/2009 |
| JP | 2009-266534 | | 11/2009 |
| JP | 2009259408 | \* | 11/2009 |
| WO | WO 2004/091029 | A1 | 10/2004 |
| WO | WO 2006/022981 | A2 | 3/2006 |

\* cited by examiner

FIG. 9
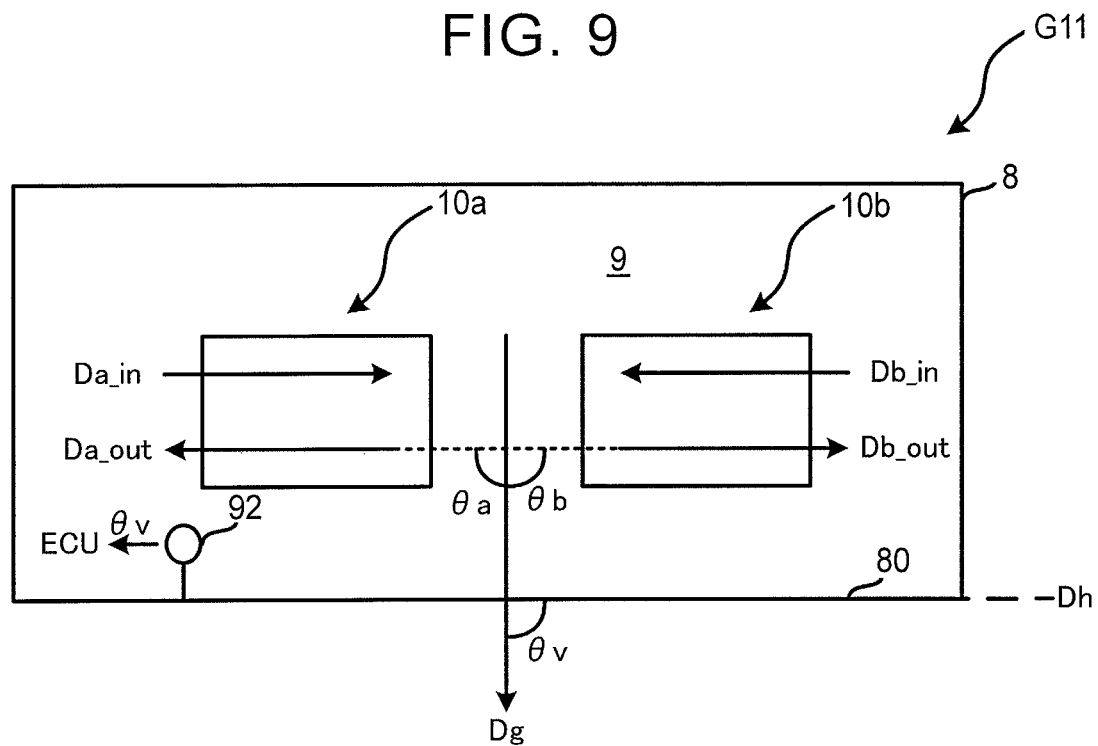
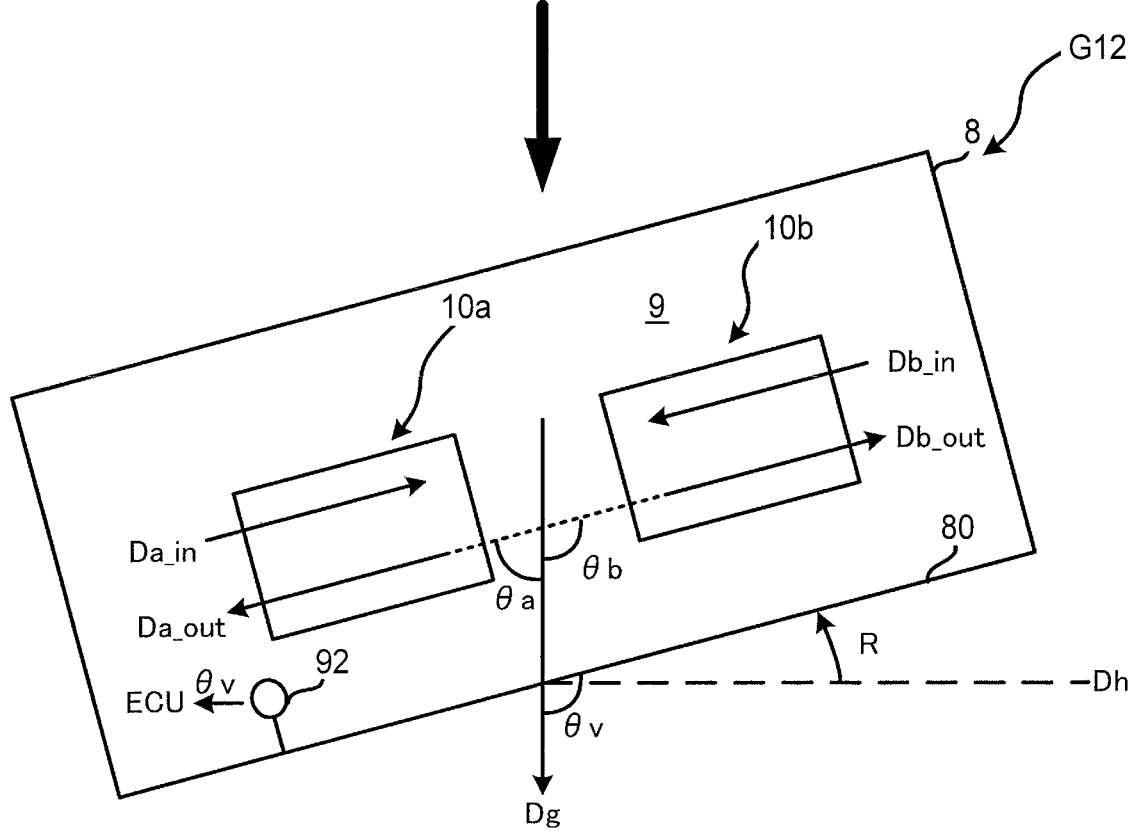

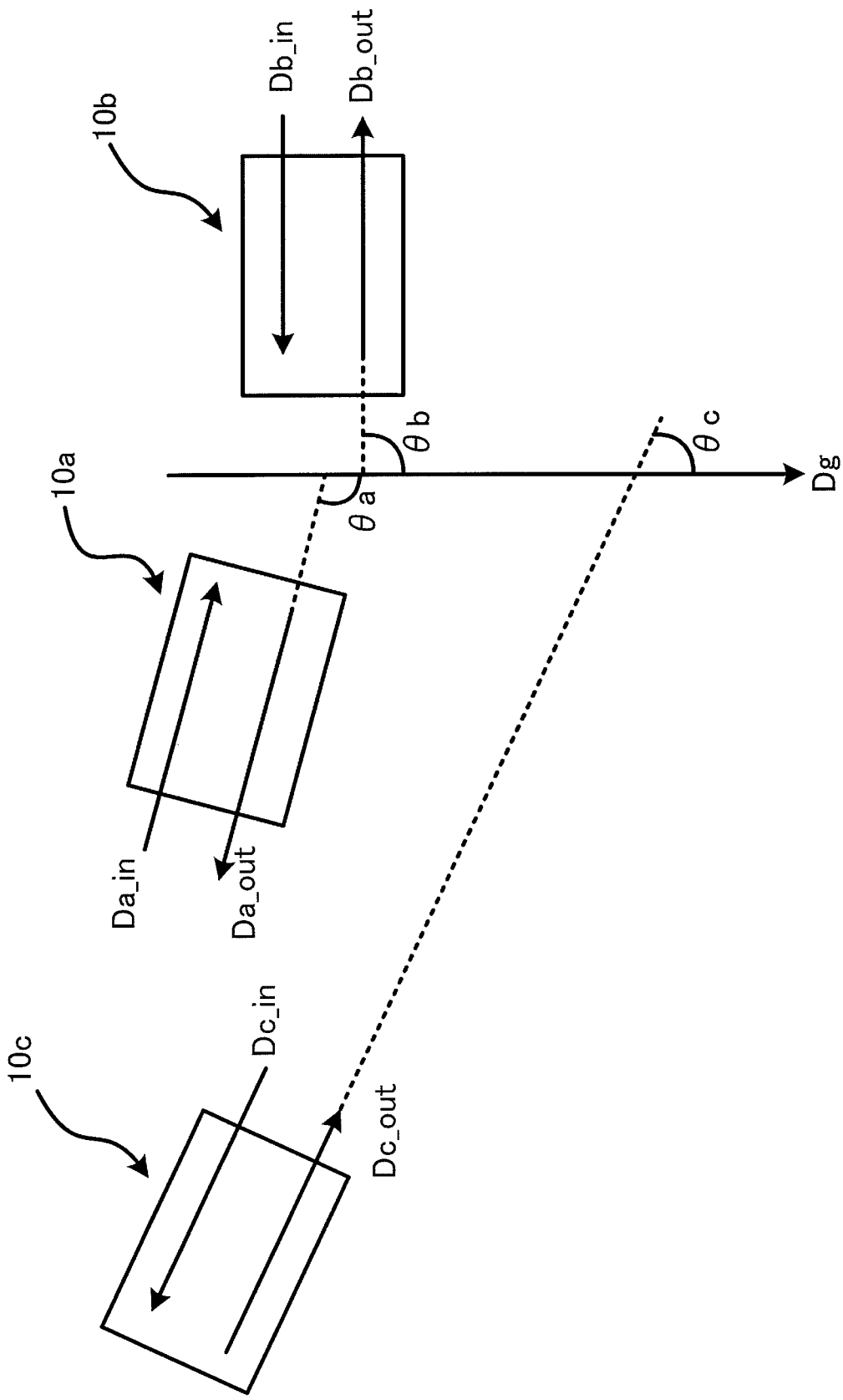

FUEL CELL SYSTEM

INCORPORATION BY REFERENCE

The disclosure of Japanese Patent Application No. 2018-229236 filed on Dec. 6, 2018 including the specification, drawings and abstract is incorporated herein by reference in its entirety.

BACKGROUND

1. Technical Field

The disclosure relates to a fuel cell system.

2. Description of Related Art

A fuel cell stack produces water when it generates electric power by using hydrogen gas and air. If water remains in the fuel cell stack when the fuel cell stack stops generating power, the water may freeze and block gas flow in a flow channel, when the fuel cell stack resumes power generation at a temperature below the freezing point, for example.

Therefore, when operation of the fuel cell stack is stopped, scavenging operation is performed to discharge water from the flow channel by feeding scavenging gas from an air pump, for example, into the fuel cell stack (see, for example, Japanese Unexamined Patent Application Publication No. 2005-276529 (JP 2005-276529 A)).

SUMMARY

However, the water remaining in the fuel cell stack is not necessarily entirely discharged through the scavenging operation. When two or more fuel cell stacks are provided, as in the fuel cell system described in JP 2005-276529 A, for example, the capacity of the air pump used for the scavenging operation may be insufficient for the volume of the flow channel in each fuel cell stack, and water may remain in the flow channel and freeze at a temperature below the freezing point.

In this case, when the fuel cell system is re-started, each fuel cell stack cannot exhibit sufficient power generation capability until freezing in the fuel cell stack disappears. Thus, since each fuel cell stack generates power with low power generation capability when the fuel cell system is re-started, wasteful power consumption occurs in various auxiliary machines used for power generation of the fuel cell stack, resulting in reduction of the efficiency.

Examples of the auxiliary machines include an air compressor that delivers air into each fuel cell stack, and an injector that injects hydrogen gas into the fuel cell stack. When the fuel cell stack starts generating power, the rotational speed of a motor of the air compressor and the amount of hydrogen gas injected by the injector, for example, increase to be greater than those during stop of power generation, according to electric power required to be generated by the fuel cell stack, resulting in increase of power consumed by the auxiliary machines.

However, when the interior of the fuel cell stack is frozen, electric power generated by the fuel cell stack is not sufficiently large, for the increase of power consumption; therefore, wasteful power consumption increases.

This disclosure provides a fuel cell system that can reduce wasteful power consumption when the system is re-started.

A fuel cell system according to one aspect of the disclosure includes a first fuel cell stack that is configured to generate power through chemical reaction of reaction gas, and has a discharge manifold configured to discharge the reaction gas, a second fuel cell stack that is configured to generate power through chemical reaction of reaction gas, and has a discharge manifold configured to discharge the reaction gas, a first auxiliary machine used for power generation of the first fuel cell stack, a second auxiliary machine used for power generation of the second fuel cell stack, and a controller configured to control operation of the first auxiliary machine and the second auxiliary machine. The controller is configured to control operation of the first auxiliary machine and the second auxiliary machine, such that one fuel cell stack of the first fuel cell stack and the second fuel cell stack, of which a discharge direction of the reaction gas discharged from the discharge manifold forms a smaller angle with a vertical downward direction, starts generating power earlier than the other fuel cell stack of the first fuel cell stack and the second fuel cell stack, after power generation of the first fuel cell stack and the second fuel cell stack is stopped.

In the fuel cell system as described above, the controller may be configured to control operation of the first auxiliary machine and the second auxiliary machine, such that the one fuel cell stack starts generating power earlier than the other fuel cell stack, when an outside air temperature is lower than a first threshold value.

In the fuel cell system as described above, the controller may be configured to control operation of the first auxiliary machine and the second auxiliary machine, such that the other fuel cell stack starts generating power, when a temperature of the other fuel cell stack becomes higher than a second threshold value, after the one fuel cell stack starts generating power.

In the fuel cell system as described above, the discharge direction of the one fuel cell stack may substantially coincide with the vertical downward direction.

In the fuel cell system as described above, the first fuel cell stack may have a plurality of unit cells, and the second fuel cell stack may have a plurality of unit cells. The number of the unit cells of the one fuel cell stack may be smaller than the number of the unit cells of the other fuel cell stack.

In the fuel cell system as described above, the first auxiliary machine may be configured to deliver scavenging gas to the discharge manifold of the first fuel cell stack, to scavenge the discharge manifold, after power generation of the first fuel cell stack is stopped, and the second auxiliary machine may be configured to deliver scavenging gas to the discharge manifold of the second fuel cell stack, to scavenge the discharge manifold, after power generation of the second fuel cell stack is stopped. One auxiliary machine of the first auxiliary machine and the second auxiliary machine which scavenges the discharge manifold of the one fuel cell stack may deliver the scavenging gas for a longer time than the other auxiliary machine of the first auxiliary machine and the second auxiliary machine which scavenges the discharge manifold of the other fuel cell stack, at substantially the same flow rate as the other auxiliary machine.

In the fuel cell system as described above, the first auxiliary machine may be configured to deliver scavenging gas to the discharge manifold of the first fuel cell stack, to scavenge the discharge manifold, after power generation of the first fuel cell stack is stopped, and the second auxiliary machine may be configured to deliver scavenging gas to the discharge manifold of the second fuel cell stack, to scavenge the discharge manifold, after power generation of the second fuel cell stack is stopped. One of the first auxiliary machine and the second auxiliary machine which scavenges the discharge manifold of the one fuel cell stack may deliver the scavenging gas at a higher flow rate than the other of the first auxiliary machine and the second auxiliary machine which scavenges the discharge manifold of the other fuel cell stack, within a predetermined time.

In the fuel cell system as described above, the first auxiliary machine may be configured to deliver scavenging gas to the discharge manifold of the first fuel cell stack, to scavenge the discharge manifold, after power generation of the first fuel cell stack is stopped, and the second auxiliary machine may be configured to deliver scavenging gas to the discharge manifold of the second fuel cell stack, to scavenge the discharge manifold, after power generation of the second fuel cell stack is stopped. One auxiliary machine of the first auxiliary machine and the second auxiliary machine which scavenges the discharge manifold of the one fuel cell stack delivers the scavenging gas for a longer time than the other auxiliary machine of the first auxiliary machine and the second auxiliary machine which scavenges the discharge manifold of the other fuel cell stack, at a higher flow rate than the other auxiliary machine.

The fuel cell system may further include a first detector configured to detect an inclination of the discharge direction of the first fuel cell stack or the second fuel cell stack relative to the vertical downward direction. The controller may be configured to determine which of the first fuel cell stack and the second fuel cell stack has the discharge direction that forms a smaller angle with the vertical downward direction, based on the inclination detected by the first detector.

The fuel cell system may further include a second detector configured to detect an inclination of a vehicle on which the fuel cell system is installed. The controller may be configured to determine which of the first fuel cell stack and the second fuel cell stack has the discharge direction that forms a smaller angle with the vertical downward direction, based on the inclination detected by the second detector.

In the fuel cell system as described above, the first fuel cell stack and the second fuel cell stack may be installed on a vehicle body of the vehicle, such that an angle of the discharge direction of the first fuel cell stack relative to the vehicle body is substantially equal to that of the second fuel cell stack.

In the fuel cell system as described above, the first fuel cell stack and the second fuel cell stack may be installed on a vehicle body of the vehicle, such that an angle of the discharge direction of the first fuel cell stack relative to the vehicle body is different from that of the second fuel cell stack.

In the fuel cell system as described above, an angle of the discharge direction of the one fuel cell stack relative to the vertical downward direction may be larger than 0 degree, and may be equal to or smaller than 180 degrees, while an angle of the discharge direction of the other fuel cell stack relative to the vertical downward direction may be larger than 0 degree, and may be equal to or smaller than 180 degrees.

According to the disclosure, wasteful power consumption can be reduced when the fuel cell system is re-started.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a view showing another example of arrangement of fuel cell stacks when the vehicle body of the fuel cell vehicle on which the fuel cell system is installed is inclined from the horizontal direction;

FIG. 13 is a view showing one example of arrangement of three fuel cell stacks.

DETAILED DESCRIPTION OF EMBODIMENTS

Configuration Example of Fuel Cell System

Figure 1:
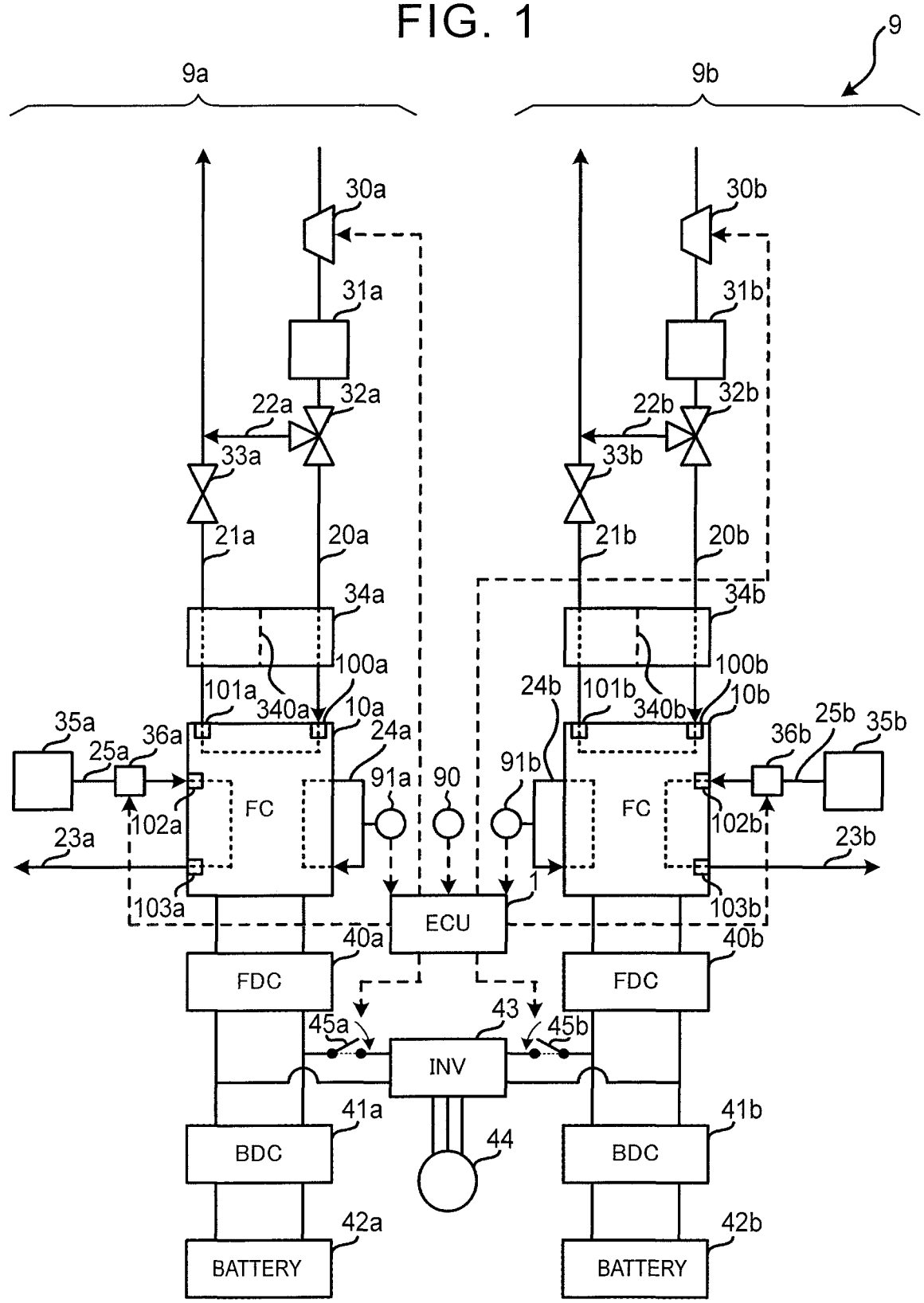
FIG. 1 is a configuration diagram showing one example of a fuel cell system.

FIG. 1 is a configuration diagram showing one example of a fuel cell system. The fuel cell system 9 is installed on a fuel cell vehicle, for example, and has a first power generation system 9a, second power generation system 9b, electronic control unit (ECU) 1, outside air temperature sensor 90, inverter (INV) 43, motor 44, and switches 45a, 45b. The fuel cell vehicle is one example of a vehicle.

The first power generation system 9a has a fuel cell stack 10a, cathode supply channel 20a, cathode discharge channel 21a, bypass channel 22a, air compressor 30a, intercooler 31a, three-way valve 32a, back pressure valve 33a, humidifier 34a, anode supply channel 25a, anode discharge channel 23a, tank 35a, and injector 36a. The first power generation system 9a further has a DC (direct current)-DC converter (FDC) 40a for the fuel cell stack 10a, battery 42a, DC-DC converter (BDC) 41a for the battery 42a, coolant circulation channel 24a, and temperature sensor 91a.

The second power generation system 9b has a fuel cell stack 10b, cathode supply channel 20b, cathode discharge channel 21b, bypass channel 22b, air compressor 30b, intercooler 31b, three-way valve 32b, back pressure valve 33b, humidifier 34b, anode supply channel 25b, anode discharge channel 23b, tank 35b, and injector 36b. The second power generation system 9b further has a DC-DC converter (FDC) 40b for the fuel cell stack 10b, battery 42b, DC-DC converter (BDC) 41b for the battery 42b, coolant circulation channel 24b, and temperature sensor 91b.

The cathode supply channel 20a, 20b is a pipe through which oxidant gas to be supplied to the fuel cell stack 10a, 10b flows, and the cathode discharge channel 21a, 21b is a pipe through which oxidant gas discharged from the fuel cell stack 10a, 10b flows. One example of the oxidant gas is air.

The bypass channel 22a, 22b is connected at one end to the cathode supply channel 20a, 20b via the three-way valve 32a, 32b, and connected at the other end to the cathode discharge channel 21a, 21b. With this arrangement, a part of the oxidant gas flows from the cathode supply channel 20a, 20b to the cathode discharge channel 21a, 21b through the bypass channel 22a, 22b, according to the opening of the three-way valve 32a, 32b on the bypass channel 22a, 22b side.

The anode supply channel 25a, 25b is a pipe through which fuel gas to be supplied to the fuel cell stack 10a, 10b flows, and the anode discharge channel 23a, 23b is a pipe through which fuel gas discharged from the fuel cell stack 10a, 10b flows. One example of the fuel gas is hydrogen gas.

The fuel cell stack 10a, 10b is a laminated body formed by laminating or stacking a plurality of polymer electrolyte unit cells. Each of the unit cells has a membrane electrode assembly (MEA) including a pair of electrodes having a platinum catalyst and an electrolyte membrane, and generates electric power through electrochemical reaction between oxygen in the oxidant gas and hydrogen in the fuel gas in the membrane electrode assembly. The fuel cell generates water as well as electric power. The oxidant gas and fuel gas are examples of reaction gas.

The oxidant gas is supplied from the cathode supply channel 20a, 20b to the fuel cell stack 10a, 10b, to be used for power generation, and is discharged from the fuel cell stack 10a, 10b into the cathode discharge channel 21a, 21b. The cathode supply channel 20a is connected to an oxidant gas supply manifold 100a provided in the fuel cell stack 10a, and the cathode supply channel 20b is connected to an oxidant gas supply manifold 100b provided in the fuel cell stack 10b. Each of the oxidant gas supply manifolds 100a, 100b is a hole through which the oxidant gas is supplied to each unit cell.

The cathode discharge channel 21a is connected to an oxidant gas discharge manifold 101a provided in the fuel cell stack 10a, and the cathode discharge channel 21b is connected to an oxidant gas discharge manifold 101b provided in the fuel cell stack 10b. Each of the oxidant gas discharge manifolds 101a, 101b is a hole through which the oxidant gas is discharged from each unit cell.

The air compressor 30a, 30b, intercooler 31a, 31b, three-way valve 32a, 32b, and humidifier 34a, 34b, which are arranged in this order in a direction from the upstream side to the downstream side, are connected to the cathode supply channel 20a, 20b.

The air compressors 30a, 30b are examples of the first auxiliary machine and second auxiliary machine used for power generation of the fuel cell stacks 10a, 10b, respectively. Each of the air compressors 30a, 30b supplies oxidant gas to the corresponding fuel cell stack 10a, 10b, via the cathode supply channel 20a, 20b. The air compressor 30a, 30b is disposed upstream of the three-way valve 32a, 32b and intercooler 31a, 31b, in the cathode supply channel 20a, 20b.

The air compressor 30a, 30b takes in oxidant gas from outside and compresses the gas. The compressed oxidant gas is fed to the intercooler 31a, 31b. The ECU 1 controls rotation of a motor (not shown) for driving the air compressor 30a, 30b. When power is generated by the fuel cell stack 10a, 10b, electricity is supplied from the fuel cell stack 10a, 10b or the battery 42a, 42b to each motor of the air compressor 30a, 30b. When the fuel cell stack 10a, 10b stops power generation, electricity is supplied from the battery 42a, 42b to the motor of the air compressor 30a, 30b.

The intercooler 31a, 31b cools oxidant gas of which the temperature has been raised by compression. The thus cooled oxidant gas is fed to the three-way valve 32a, 32b.

A part of the oxidant gas flows from the three-way valve 32a, 32b to the bypass channel 22a, 22b, and is discharged from the cathode discharge channel 21a, 2 lb. The remaining part of the oxidant gas flows to the humidifier 34a, 34b through the cathode supply channel 20a, 20b. The humidifier 34a, 34b humidifies oxidant gas in the cathode supply channel 20a, 20b, by use of water contained in the oxidant gas flowing in the cathode discharge channel 21a, 21b.

The humidifier 34a, 34b allows at least a part of the oxidant gas flowing in the cathode discharge channel 21a, 21b having a relatively high humidity, to pass through a membrane 340a, 340b formed from hollow fibers, for example, to one side of the membrane 340a, 340b. Also, the humidifier 34a, 34b allows at least a part of the oxidant gas flowing in the cathode supply channel 20a, 20b having a relatively low humidity, to pass through the membrane 340a, 340b, to the other side thereof. In this manner, the humidifier 34a, 34b humidifies oxidant gas by causing water or moisture to permeate through the membrane 340a, 340b. However, the humidification method is not limited to this, but other humidification methods may be used.

The humidifier 34a, 34b and the back pressure valve 33a, 33b are connected to the cathode discharge channel 21a, 21b. The humidifier 34a, 34b takes water out of the oxidant gas flowing in the cathode discharge channel 21a, 21b, for use in humidification of the oxidant gas in the cathode supply channel 20a, 20b. The back pressure valve 33a, 33b adjusts the back pressure of the oxidant gas.

The anode supply channel 25a is connected to the fuel gas supply manifold 102a provided in the fuel cell stack 10a, and the anode supply channel 25b is connected to the fuel gas supply manifold 102b provided in the fuel cell stack 10b. Each of the fuel gas supply manifolds 102a, 102b is a hole through which fuel gas is supplied to each unit cell.

The tank 35a, 35b and the injector 36a, 36b, which are arranged in a direction from the upstream side to the downstream side, are connected to the anode supply channel 25a, 25b. The tank 35a, 35b stores the fuel gas under pressure. The fuel gas in the tank 35a, 35b flows into the injector 36a, 36b.

The injectors 36a, 36b are examples of the first auxiliary machine and second auxiliary machine used for power generation of the fuel cell stacks 10a, 10b, respectively. Each of the injectors 36a, 36b injects the fuel gas supplied to the corresponding fuel cell stack 10a, 10b. The ECU 1 controls the amount (which will be referred to as "injection amount") of the fuel gas injected by the injector 36a, 36b, for example.

When power is generated by the fuel cell stack 10a, 10b, electricity is supplied from the fuel cell stack 10a, 10b or the battery 42a, 42b to the injector 36a, 36b. When the fuel cell stack 10a, 10b stops power generation, electricity is supplied from the battery 42a, 42b to the injector 36a, 36b. A pressure regulating valve (not shown) is provided between each injector 36a, 36b and the corresponding tank 35a, 35b.

The anode discharge channel 23a is connected to the fuel gas discharge manifold 103a provided in the fuel cell stack 10a, and the anode discharge channel 23b is connected to the fuel gas discharge manifold 103b provided in the fuel cell stack 10b. Each of the fuel gas discharge manifolds 103a, 103b is a hole through which the fuel gas is discharged from each unit cell.

While the fuel cell stack 10a, 10b generates heat when generating electric power, it is cooled with coolant flowing through the coolant circulation channel 24a, 24b, so that a temperature rise in the fuel cell stack 10a, 10b is restricted. Although not illustrated in the drawings, a radiator for cooling the coolant heated in the fuel cell stack 10a, 10b, and a pump for circulating the coolant through the coolant circulation channel 24a, 24b, are provided in the coolant circulation channel 24a, 24b. Also, a temperature sensor 91a, 91b that detects the temperature of the coolant is provided in the coolant circulation channel 24a, 24b.

The DC-DC converter 40a, 40b includes a switching device, such as a transistor; and boosts the output voltage of the fuel cell stack 10a, 10b through switching control of the switching device. The boosting operation of the DC-DC converter 40a, 40b is controlled by the ECU 1. The inverter 43 includes a transformer, transistors, and so forth, and converts output current of the fuel cell stack 10a, 10b from direct current into alternating current. The motor 44 for driving wheels (not shown) of the fuel cell vehicle is connected to the inverter 43. The motor 44 is rotated with the alternating current.

The inverter 43 is connected to the DC-DC converters 40a, 40b, 41a, 41b, via the switches 45a, 45b. The ON/OFF of the switches 45a, 45b is controlled by the ECU 1. Thus, the switch 45a electrically connects or disconnects the fuel cell stack 10a and the battery 42a to or from the inverter 43, and the switch 45b electrically connects or disconnects the fuel cell stack 10b and the battery 42b to or from the inverter 43.

While the DC-DC converters 40a, 40b, 41a, 41b and the switches 45a, 45b are respectively independently provided in the arrangement of this embodiment, the arrangement is not limited to this. For example, only the DC-DC converters 40a, 40b, 41a, 41b may be provided, and the fuel cell stacks 10a, 10b and the batteries 42a, 42b may be electrically connected to or disconnected from the inverter 43, using switching devices incorporated in the DC-DC converters 40a, 40b, 41a, 41b.

The battery 42a, 42b stores surplus electric power of the fuel cell stack 10a, 10b. The DC-DC converter 41a, 41b includes a switching device, such as a transistor, and boosts the output voltage of the battery 42a, 42b, through switching control of the switching device. The power of the battery 42a, 42b is supplied to the motor 44, via the inverter 43, for example.

The ECU 1 is one example of the controller, and controls operation of the fuel cell system 9. The ECU 1 has a central processing unit (CPU), and a memory that stores programs for driving the CPU and various kinds of data, for example.

The ECU 1 controls the switch 45a to the ON state when it causes the fuel cell stack 10a to start power generation, and controls the switch 45a to the OFF state when it causes the fuel cell stack 10a to stop power generation. Also, the ECU 1 controls the switch 45b to the ON state when it causes the fuel cell stack 10b to start power generation, and controls the switch 45b to the OFF state when it causes the fuel cell stack 10b to stop power generation.

When each of the switches 45a, 45b is placed in the ON state, the corresponding fuel cell stack 10a, 10b is electrically connected to the inverter 43; thus, when sufficient amounts of fuel gas and oxidant gas for electric power required to be generated by the fuel cell stack 10a, 10b (which will be referred to as "required power") are supplied to the fuel cell stack 10a, 10b, chemical reaction between the fuel gas and the oxidant gas starts, and the fuel cell stack 10a, 10b starts power generation. When each of the switches 45a, 45b is placed in the OFF state, the corresponding fuel cell stack 10a, 10b is electrically disconnected from the inverter 43; as a result, chemical reaction between the fuel gas and the oxidant gas stops, and the fuel cell stack 10a, 10b stops power generation. The required power is determined based on the pedal stroke or operation amount of an accelerator pedal of the fuel cell vehicle, for example.

The ECU 1 obtains the temperatures of the coolant from the temperature sensors 91a, 91b, so as to monitor the temperatures of the fuel cell stacks 10a, 10b. Further, the ECU 1 obtains the outside air temperature from the outside air temperature sensor 90, so as to monitor the outside air temperature.

The ECU 1 controls rotation of motors for driving the air compressors 30a, 30b. When the ECU 1 causes the fuel cell stack 10a to start power generation, it increases the motor speed of the air compressor 30a from a predetermined speed to a rotational speed commensurate with the required power of the fuel cell stack 10a. As a result, electric power consumed by the air compressor 30a increases to be larger than that during stop of power generation, and a sufficient amount of oxidant gas for the required power is supplied to the fuel cell stack 10a. Here, the predetermined speed may be zero, or may be a rotational speed sufficient to keep a condition where a desired pressure is applied to a channel of oxidant gas including the oxidant gas supply manifold 100a and oxidant gas discharge manifold 101a during stop of power generation of the fuel cell stack 10a. This rotational speed is lower than the rotational speed during power generation.

On the other hand, when the ECU 1 causes the fuel cell stack 10b to start power generation, it increases the rotational speed of the air compressor 30b from a predetermined speed to a rotational speed commensurate with the required power of the fuel cell stack 10b. As a result, electric power consumed by the air compressor 30b increases to be larger than that during stop of power generation, and a sufficient amount of oxidant gas for the required power is supplied to the fuel cell stack 10b. Also, when the ECU 1 causes the fuel cell stacks 10a, 10b to stop power generation, it reduces the motor speeds of the air compressors 30a, 30b to the predetermined speed.

After the fuel cell stack 10a, 10b stops power generation, the air compressor 30a, 30b scavenges the cathode supply channel 20a, 20b, cathode discharge channel 21a, 21b, oxidant gas supply manifold 100a, 100b, and oxidant gas exhaust manifold 101a, 101b, according to a control signal from the ECU 1. As a result, water remaining in the cathode supply channel 20a, 20b, cathode discharge channel 21a, 21b, oxidant gas supply manifold 100a, 100b, and oxidant gas exhaust manifold 101a, 101b is discharged.

When the ECU 1 causes the fuel cell stack 10a to start power generation, it increases the injection amount of the injector 36a, from a predetermined amount to an amount commensurate with the required power of the fuel cell stack 10a. As a result, electric power consumed by the injector 36a increases to be larger than that during stop of power generation, and a sufficient amount of fuel gas for the required power is supplied to the fuel cell stack 10a. Here, the predetermined amount may be zero, or may be an injection amount sufficient to keep a condition where a desired pressure is applied to a channel of fuel gas including the fuel gas supply manifold 102a and the fuel gas discharge manifold 103a during stop of power generation of the fuel cell stack 10*a*. This injection amount is smaller than the injection amount during power generation.

On the other hand, when the ECU 1 causes the fuel cell stack 10*b* to start power generation, it increases the injection amount of the injector 36*b*, from a predetermined amount to an amount commensurate with the required power of the fuel cell stack 10*b*. As a result, electric power consumed by the injector 36*b* increases to be larger than that during stop of power generation, and a sufficient amount of fuel gas for the required power is supplied to the fuel cell stack 10*b*. Also, when the ECU 1 causes the fuel cell stacks 10*a*, 10*b* to stop power generation, it reduces the injection amounts of the injectors 36*a*, 36*b* to the predetermined amount.

Next, processing of the ECU 1 will be described.

Operation of Fuel Cell Stack 10*a*, 10*b* Upon Stop of Power Generation

Figure 2:
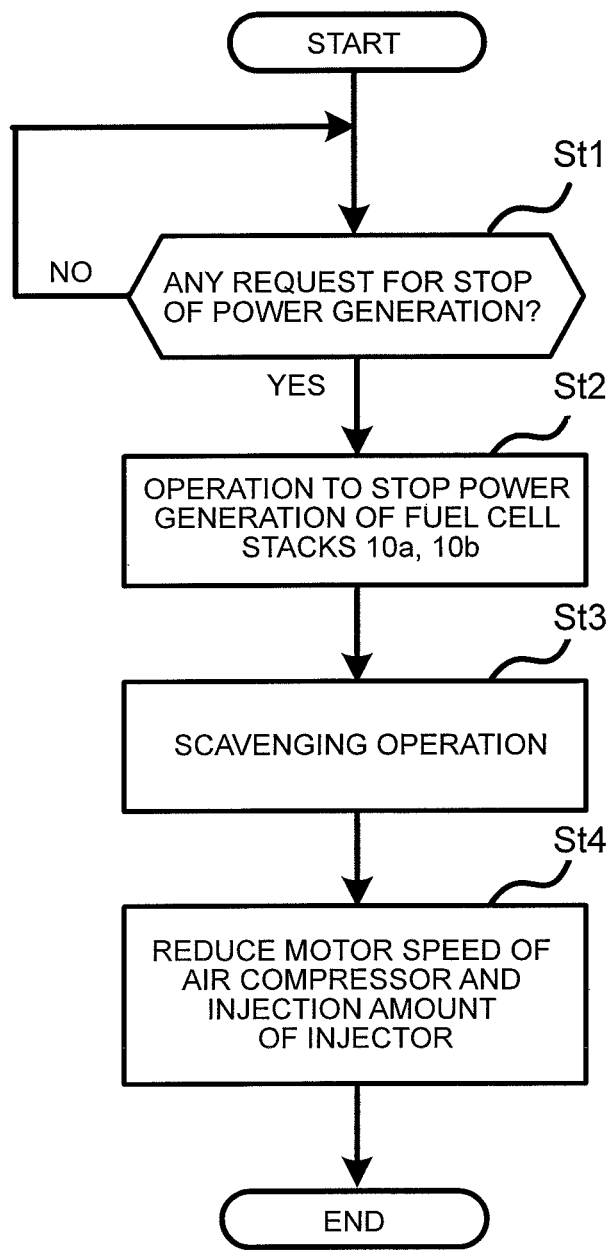
FIG. 2 is a flowchart illustrating one example of processing of an electronic control unit (ECU) when power generation of fuel cell stacks is stopped.

FIG. 2 is a flowchart illustrating one example of processing of the ECU 1 at the time when power generation of the fuel cell stack 10*a*, 10*b* is stopped. It is assumed that the fuel cell stack 10*a*, 10*b* is generating electric power, before this processing is started.

The ECU 1 determines whether there is a request for stop of power generation of the fuel cell stacks 10*a*, 10*b* (step SU). When the ECU 1 receives a signal indicating that an ignition switch (not shown) is turned off, for example, it determines that it has received the request for stop of power generation. When there is no request for stop of power generation (NO in step St1), the ECU 1 executes step St1 again.

When there is a request for stop of power generation (YES in step St1), the ECU 1 performs operation to stop power generation of the fuel cell stacks 10*a*, 10*b* (step St2). At this time, the ECU 1 controls the switches 45*a*, 45*b* of the fuel cell stacks 10*a*, 10*b* to the OFF states.

Then, the ECU 1 causes the air compressors 30*a*, 30*b* to perform scavenging operation (step St3). The air compressors 30*a*, 30*b* perform scavenging operation by delivering air (oxidant gas) under scavenging conditions set by the ECU 1.

Then, the ECU 1 reduces the motor speeds of the air compressors 30*a*, 30*b* from the rotational speed commensurate with the required power to the predetermined speed, and reduces the injection amounts of the injectors 36*a*, 36*b* from the injection amount commensurate with the required power to the predetermined amount (step St4). The predetermined speed and the predetermined amount may be zero. However, when power generation is predicted to be resumed soon after stop of power generation, the predetermined speed and the predetermined amount may be set to low values for keeping the pressure of a passage of the oxidant gas and the pressure of the fuel gas in the fuel cell stacks 10*a*, 10*b* at appropriate values.

Through the above scavenging operation, water remaining in the cathode supply channels 20*a*, 20*b*, cathode discharge channels 21*a*, 21*b*, oxidant gas supply manifolds 100*a*, 100*b*, and oxidant gas discharge manifolds 101*a*, 101*b* is discharged. The anode supply channels 25*a*, 25*b*, anode discharge channels 23*a*, 23*b*, fuel gas supply manifolds 102*a*, 102*b*, and fuel gas discharge manifolds 103*a*, 103*b* are scavenged in the same manner as described above, by means of the injectors 36*a*, 36*b* or pumps (not shown).

However, water is not necessarily entirely discharged from the fuel cell stacks 10*a*, 10*b* through the scavenging operation. Thus, water remaining in the fuel cell stacks 10*a*, 10*b* may freeze at a temperature below the freezing point, for example. In this case, each fuel cell stack 10*a*, 10*b* cannot exhibit favorable power generation capability until freezing in the fuel cell stack 10*a*, 10*b* disappears when the fuel cell system 9 is re-started.

Accordingly, even when the fuel cell system 9 is re-started, each fuel cell stack 10*a*, 10*b* may generate electric power with a low power generation capability, and wasteful power consumption may appear in various auxiliary machines around the fuel cell stack 10*a*, 10*b*, resulting in reduction of the efficiency. These auxiliary machines include, for example, the air compressors 30*a*, 30*b* and the injectors 36*a*, 36*b*.

In view of the above situation, the ECU 1 provides a difference between the time of start of power generation of the fuel cell stack 10*a* and that of the fuel cell stack 10*b*. More specifically, the ECU 1 controls the air compressors 30*a*, 30*b* and the injectors 36*a*, 36*b*, so that one of the fuel cell stacks 10*a*, 10*b*, which has a lower degree of freezing of water, starts power generation earlier than the other fuel cell stack. As a result, only the above-indicated one of the fuel cell stacks 10*a*, 10*b*, which has the higher power generation capability, generates electric power at first, so that wasteful power consumption can be reduced.

The ECU 1 selects the fuel cell stack 10*a*, 10*b* that starts power generation earlier, based on the angle of the discharge direction of the oxidant gas discharged from the oxidant gas discharge manifold 101*a*, 101*b* of each fuel cell stack 10*a*, 10*b*. Some examples of the arrangement of the fuel cell stacks 10*a*, 10*b* will be described below.

First Arrangement Example of Fuel Cell Stacks 10*a*, 10*b*

Figure 3:
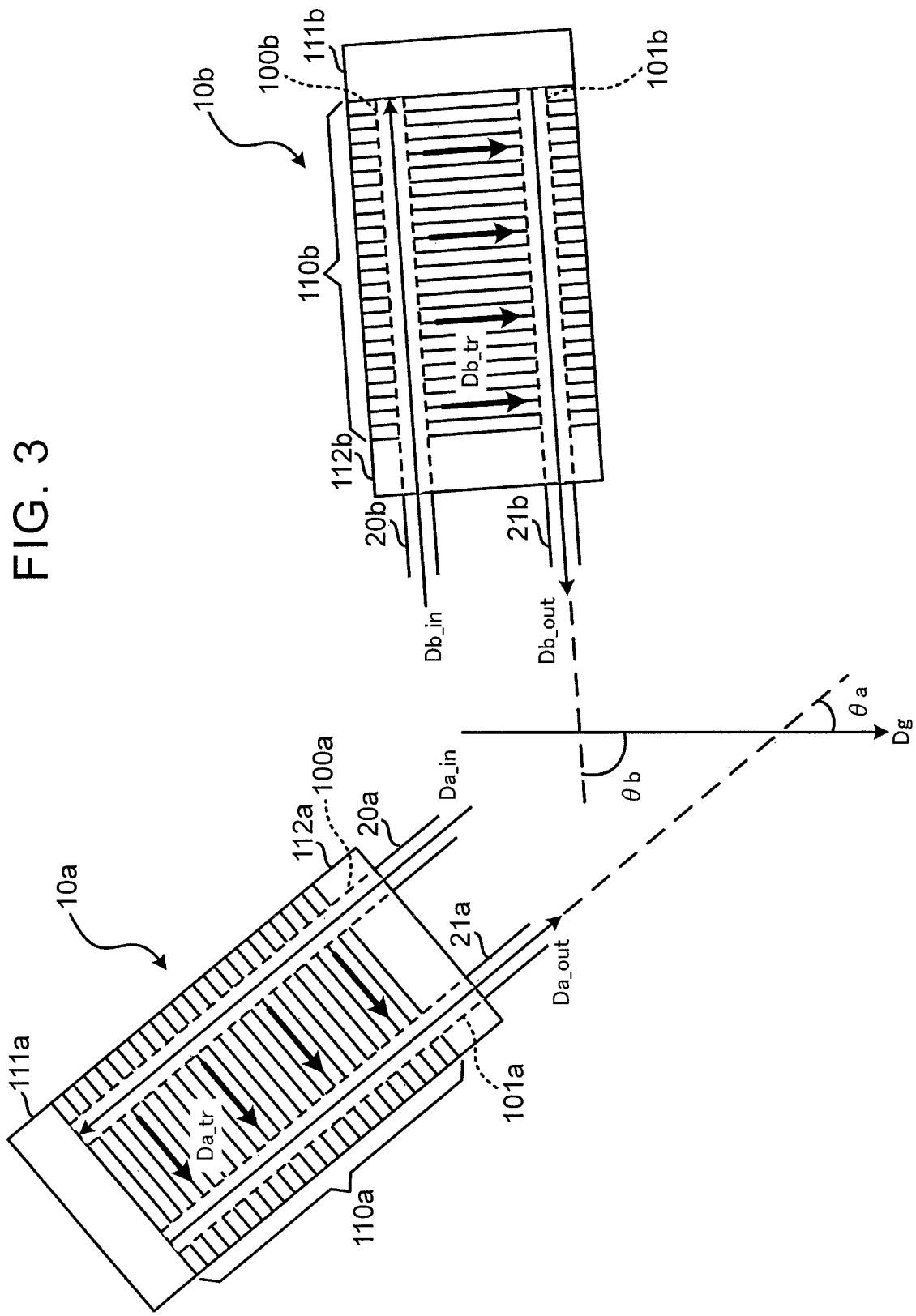
FIG. 3 is a view showing a first arrangement example of fuel cell stacks.

FIG. 3 shows a first arrangement example of the fuel cell stacks 10*a*, 10*b*. FIG. 3 shows the fuel cell stacks 10*a*, 10*b* of the fuel cell system 9 installed on the fuel cell vehicle, when viewed in the horizontal direction. In FIG. 3, an arrow labelled "Dg" indicates a vertical downward direction.

Initially, the structure of the fuel cell stacks 10*a*, 10*b* will be described. The fuel cell stacks 10*a*, 10*b* have the same size and structure.

The fuel cell stack 10*a* includes a pair of end plates 111*a*, 112*a*, and a plurality of unit cells 110*a*. The end plates 111*a*, 112*a* are fastened to each other in a condition where the unit cells 110*a* are sandwiched therebetween, so as to compress the unit cells 110*a* in the stacking direction.

The oxidant gas supply manifold 100*a* and oxidant gas discharge manifold 101*a* are provided in one of the end plates 112*a* and the unit cells 110*a*, such that the manifolds 100*a*, 101*a* extend through the end plate 112*a* and the unit cells 110*a* in the stacking direction. While the oxidant gas supply manifold 100*a* and the oxidant gas discharge manifold 101*a* are provided in parallel with each other in the example of FIG. 3, the arrangement of the manifolds 100*a*, 101*a* is not limited to this, but the manifolds 100*a*, 101*a* may not be arranged in parallel with each other.

The oxidant gas flows from the cathode supply channel 20*a* into the oxidant gas supply manifold 100*a* along a supply direction Da_in, and flows through a channel in each unit cell 110*a* along a flow direction Da_tr, into the oxidant gas discharge manifold 101*a*. At this time, water generated through power generation in each unit cell 110*a* flows into the oxidant gas discharge manifold 101*a*, along with the oxidant gas.

The oxidant gas flows from the oxidant gas discharge manifold 101*a* into the cathode discharge channel 21*a*, along a discharge direction Da_out.

Also, the fuel cell stack 10*b* includes a pair of end plates 111*b*, 112*b* and a plurality of unit cells 110*b*. The end plates 111*b*, 112*b* are fastened to each other in a condition where the unit cells 110*b* are sandwiched therebetween, so as to compress the unit cells 110*b* in the stacking direction. The number of sheets of the unit cells 110b is equal to that of the unit cells 110a of the other fuel cell stack 10a.

The oxidant gas supply manifold 100b and oxidant gas discharge manifold 101b are provided in one of the end plates 112b and the unit cells 110b, such that the manifolds 100b, 101b extend through the end plate 112b and the unit cells 110b in the stacking direction. While the oxidant gas supply manifold 100b and the oxidant gas discharge manifold 101b are provided in parallel with each other in the example of FIG. 3, the arrangement of the manifolds 100b, 101b is not limited to this, but the manifolds 100b, 101b may not be arranged in parallel with each other.

The oxidant gas flows from the cathode supply channel 20b into the oxidant gas supply manifold 100b along a supply direction Db_in, and flows through a channel in each unit cell 110b along a flow direction Db_tr, into the oxidant gas discharge manifold 101b. At this time, water generated through power generation in each unit cell 110b flows into the oxidant gas discharge manifold 101b, along with the oxidant gas.

The oxidant gas flows from the oxidant gas discharge manifold 101b into the cathode discharge channel 21b, along a discharge direction Db_out.

The discharge direction Da_out of the oxidant gas discharge manifold 101a of the fuel cell stack 10a forms an angle θa (0 degree<θa≤180 degrees) with the vertical downward direction Dg, and the discharge direction Db_out of the oxidant gas discharge manifold 101b of the fuel cell stack 10b forms an angle θb (0 degree<θb≤180 degrees) with the vertical downward direction Dg. Here, the angle θa of the discharge direction Da_out is smaller than the angle θb of the discharge direction Db_out. Namely, the discharge direction Da_out of the fuel cell stack 10a forms a smaller angle with the vertical downward direction Dg than the discharge direction Db_out of the fuel cell stack 10b.

Accordingly, the inclination of the oxidant gas discharge manifold 101a is larger than that of the oxidant gas discharge manifold 101b; therefore, water in the oxidant gas discharge manifold 101a is more likely to be discharged than water in the oxidant gas discharge manifold 101b. Thus, when the fuel cell stacks 10a, 10b are left as they stand in an environment below the freezing point, for example, after the fuel cell stacks 10a, 10b stop power generation, and water freezes in the oxidant gas discharge manifolds 101a, 101b, to block the passage of the oxidant gas, the degree of reduction of the power generation capability of the one fuel cell stack 10a due to the blocking is smaller than that of the other fuel cell stack 10b. Accordingly, when the fuel cell system 9 is re-started below the freezing point, the power generation capability of the above-indicated one fuel cell stack 10a is higher than that of the other fuel cell stack 10b.

When the fuel cell system 9 starts at ordinary temperatures (e.g., at 25 degrees), the power generation capability of the fuel cell stack 10a is less likely or unlikely to be reduced due to flooding, than that of the other fuel cell stack 10b, since the amount of water in the oxidant gas discharge manifold 101a of the fuel cell stack 10a is smaller than that in the oxidant gas discharge manifold 101b of the other fuel cell stack 10b. Therefore, the power generation capability of the fuel cell stack 10a is higher than that of the other fuel cell stack 10b.

Thus, the ECU 1 controls the air compressor 30a and the injector 36a, so that the fuel cell stack 10a having the higher power generation capability starts power generation earlier than the other fuel cell stack 10b. At this time, for example, the ECU 1 initially increases the motor speed of the air compressor 30a from a predetermined speed, to a rotational speed commensurate with the required power of the fuel cell stack 10a, and increases the injection amount of the injector 36a from a predetermined amount, to an injection amount commensurate with the required power of the fuel cell stack 10a. Then, the ECU 1 places the switch 45a of the fuel cell stack 10a in the ON state, so that the fuel cell stack 10a starts generating power.

Thus, since the fuel cell stack 10b having the lower power generation capability starts power generation later than the fuel cell stack 10a having the higher power generation capability, the motor speed of the air compressor 30b and the injection amount of the injector 36b are kept at lower values than those after start of power generation, or zero, during stop of power generation. As a result, wasteful power consumption of the air compressor 30b and the injector 36b is reduced.

When one of the fuel cell stacks 10a starts generating power, in the case where the fuel cell stacks 10a, 10b are located close to each other, for example, the temperature of the other fuel cell stack 10b is raised due to radiation heat generated through power generation of the fuel cell stack 10a, for example, or because the fuel cell stack 10b is heated by backward flow of a radiator.

Thus, the ECU 1 controls the air compressor 30b and the injector 36b, so that the fuel cell stack 10b starts generating power, when the temperature of the other fuel cell stack 10b is raised to a temperature level sufficient to eliminate freezing, after the one fuel cell stack 10a starts power generation. For example, when the temperature of the coolant of the fuel cell stack 10b reaches a predetermined temperature, the ECU 1 initially increases the motor speed of the air compressor 30b from a predetermined speed, to a rotational speed commensurate with the required power of the fuel cell stack 10b, and increases the injection amount of the injector 36b from a predetermined amount, to an injection amount commensurate with the required power of the fuel cell stack 10b. Then, the ECU 1 places the switch 45b of the fuel cell stack 10b in the ON state, so that the fuel cell stack 10b starts generating power.

Thus, since the fuel cell stack 10b can start generating power when its power generation capability becomes higher than that at the time when the fuel cell stack 10a start power generation, wasteful power consumption of the air compressor 30b and the injector 36b is reduced.

Second Arrangement Example of Fuel Cell Stacks 10a, 10b

Figure 4:
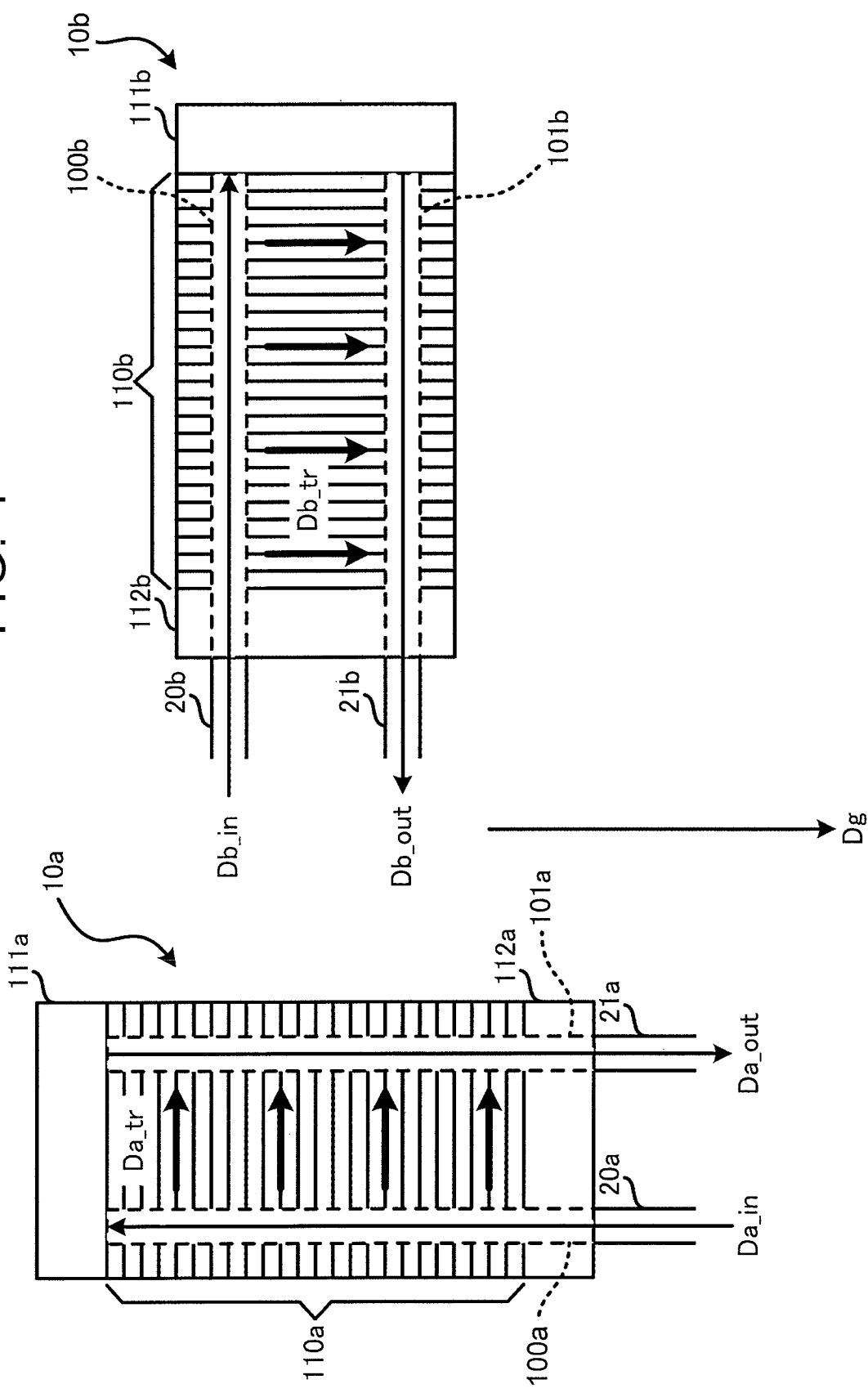
FIG. 4 is a view showing a second arrangement example of fuel cell stacks.

FIG. 4 shows a second arrangement example of the fuel cell stacks 10a, 10b. In FIG. 4 the same reference numerals or symbols are assigned to the same components or directions as those of FIG. 3, and these components or directions will not be further described.

In the example of FIG. 4, the discharge direction Da_out of the oxidant gas discharge manifold 101a of the fuel cell stack 10a coincides with the vertical downward direction Dg. Therefore, the amount of water in the oxidant gas discharge manifold 101a is smaller than that of water in the oxidant gas discharge manifold 101a of the first arrangement example. Accordingly, the power generation capability of the fuel cell stack 10a at the start of power generation is higher than that in the case of the first arrangement example.

Also, the discharge direction Db_out of the oxidant gas discharge manifold 101b of the other fuel cell stack 10b coincides with the horizontal direction, as one example. Namely, the discharge direction Db_out of the oxidant gas discharge manifold 101b forms a right angle with the vertical downward direction Dg. Thus, the discharge direction Da_out of the oxidant gas discharge manifold 101a forms a smaller angle with the vertical downward direction Dg than the discharge direction Db_out of the oxidant gas discharge manifold 101b.

Accordingly, the ECU 1 causes the fuel cell stack 10a of which the discharge direction Da_out coincides with the vertical downward direction, to start power generation earlier than the fuel cell stack 10b. Since the power generation capability of the fuel cell stack 10a at the start of power generation is higher than that in the case of the first arrangement example, wasteful power consumption of the air compressor 30b and the injector 36b is more effectively reduced.

Re-Starting Process of Fuel Cell System 9

Figure 5:
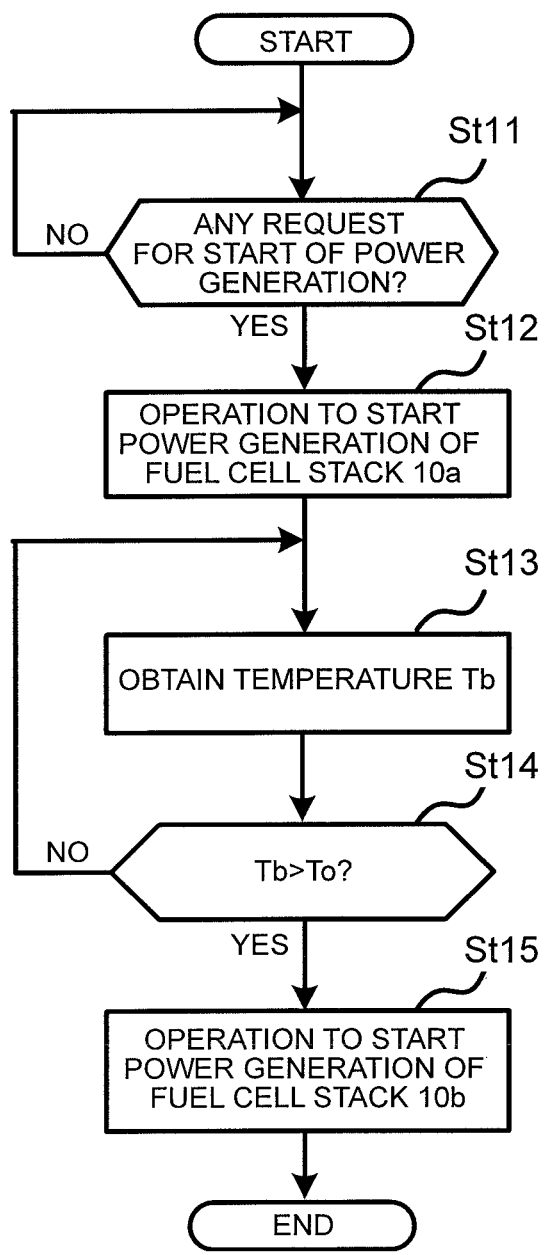
FIG. 5 is a flowchart illustrating one example of a re-starting process of the fuel cell system.

FIG. 5 is a flowchart illustrating one example of a re-starting process of the fuel cell system 9. Before start of this process, the fuel cell stacks 10a, 10b stop power generation, according to the process shown in FIG. 2. The arrangement of the fuel cell stacks 10a, 10b is that of the first arrangement example or the second arrangement example.

The ECU 1 determines whether there is a request for start of power generation of the fuel cell stacks 10a, 10b (step St11). When the ECU 1 receives a signal indicating that the ignition switch (not shown) is turned on, for example, it determines that it has received the request for start of power generation. When there is no request for start of power generation (NO in step St11), the ECU 1 executes step St11 again.

When there is a request for start of power generation (YES in step St11), the ECU 1 performs operation to start power generation of the fuel cell stack 10a (step St12). At this time, the ECU 1 increases the motor speed of the air compressor 30a and the injection amount of the injector 36a from respective predetermined values, and places the switch 45a of the fuel cell stack 10a in the ON state. Meanwhile, the ECU 1 keeps the motor speed of the air compressor 30b and the injection amount of the injector 36b at respective predetermined values, so that power generation of the other fuel cell stack 10b remains stopped, and keeps the switch 45b of the fuel cell stack 10b in the OFF state.

Then, in order to determine whether the fuel cell stack 10b that has not generated power can start generating power, the ECU 1 obtains the temperature Tb of its coolant from the temperature sensor 91b (step St13), and compares the temperature Tb with a predetermined temperature To (step St14). In this connection, the temperature To is one example of the second threshold value, and is set in advance to a temperature level sufficient to eliminate freezing of water in the oxidant gas discharge manifold 101b of the fuel cell stack 10b, for example. Since the coolant discharged from the fuel cell stack 10b absorbs heat of the fuel cell stack 10b heated by the other fuel cell stack 10a that is generating power, the temperature Tb of the coolant can be regarded as the temperature of the fuel cell stack 10b.

When the temperature Tb is equal to or lower than the temperature To (Tb≤To) (NO in step St14), the ECU 1 determines that water in the oxidant gas discharge manifold 101b remains frozen, and executes step St13 again. When the temperature Tb is higher than the temperature To (Tb>To) (YES in step St14), the ECU 1 determines that there is no freezing of water in the oxidant gas discharge manifold 101b, and performs operation to start power generation of the fuel cell stack 10b (step St15). At this time, the ECU 1 increases the motor speed of the air compressor 30b and the injection amount of the injector 36b from respective predetermined values, and places the switch 45b of the fuel cell stack 10b in the ON state. In this manner, the re-starting process of the fuel cell system 9 is carried out.

Thus, after each fuel cell stack 10a, 10b stops generating power, the ECU 1 controls operation of the air compressors 30a, 30b and the injectors 36a, 36b, so that the fuel cell stack 10a of which the discharge direction Da_out of the oxidant gas discharged from the oxidant gas discharge manifold 101a forms a smaller angle with the vertical downward direction Dg, as one of the fuel cell stacks 10a, 10b, starts generating power earlier than the other fuel cell stack 10b.

Therefore, out of the fuel cell stacks 10a, 10b, the fuel cell stack 10a having a smaller amount of water in the oxidant gas discharge manifold 101a and having a higher power generation capability starts generating power earlier, and the fuel cell stack 10b having a larger amount of water in the oxidant gas discharge manifold 101b and having a lower power generation capability starts generating power with a delay. Accordingly, while the fuel cell stack 10b stops generating power, wasteful power consumption of the air compressor 30b and the injector 36b is reduced.

When the temperature Tb of the other fuel cell stack 10b becomes higher than the predetermined temperature To, after the fuel cell stack 10a having the higher power generation capability starts generating power, the ECU 1 controls operation of the air compressor 30b and the injector 36b, so that the fuel cell stack 10b starts generating power. Thus, since the fuel cell stack 10b can start generating power when its power generation capability becomes higher than that at the start of power generation of the fuel cell stack 10a, wasteful power consumption of the air compressor 30b and the injector 36b is reduced.

In this example, the discharge direction Da_out of the oxidant gas discharge manifold 101a of the fuel cell stack 10a forms a smaller angle with the vertical downward direction Dg than the discharge direction Db_out of the oxidant gas discharge manifold 101b of the fuel cell stack 10b. To the contrary, the discharge direction Db_out of the oxidant gas discharge manifold 101b may form a smaller angle with the vertical downward direction Dg than the discharge direction Da_out of the oxidant gas discharge manifold 101a. In this case, the ECU 1 causes the fuel cell stack 10b to start generating power earlier than the fuel cell stack 10a.

Also, the ECU 1 obtains the temperature Ta of the coolant of the fuel cell stack 10a from the temperature sensor 91a, and compares it with the predetermined temperature To. When the temperature Ta is higher than the temperature To (Ta>To), the ECU 1 causes the fuel cell stack 10a to start generating power.

In this case, out of the fuel cell stacks 10a, 10b, the fuel cell stack 10b having a smaller amount of water in the oxidant gas discharge manifold 101b and having the higher power generation capability starts generating power earlier, and the fuel cell stack 10a having a larger amount of water in the oxidant gas discharge manifold 101a and having the lower power generation capability starts generating power with a delay. Accordingly, while the fuel cell stack 10a stops generating power, wasteful power consumption of the air compressor 30a and the injector 36a is reduced.

In this example, the temperature of the fuel cell stack 10a that starts generating power earlier rises sooner than that of the other fuel cell stack 10b; therefore, the fuel cell stack 10a may perform warm-up operation on the fuel cell stack 10b. The wan i-up operation may be performed by feeding coolant in the coolant circulation channel 24a of the fuel cell stack 10a, into the coolant circulation channel 24b of the other fuel cell stack 10b, using a pump or valve, for example, or may be performed by heating the other fuel cell stack 10*b* with a heater to which electric power is supplied from the fuel cell stack 10*a*.

In this example, the ECU 1 performs the re-starting process on the fuel cell system 9 when the ignition switch is turned on, but the re-starting process may be performed on other occasions. For example, the ECU 1 may perform the re-starting process when the fuel cell system 9 that is in an idling state is brought back into a normal operating state, for example.

Number of Unit Cells 110*a*, 110*b* of Fuel Cell Stacks 10*a*, 10*b*

Figure 6:
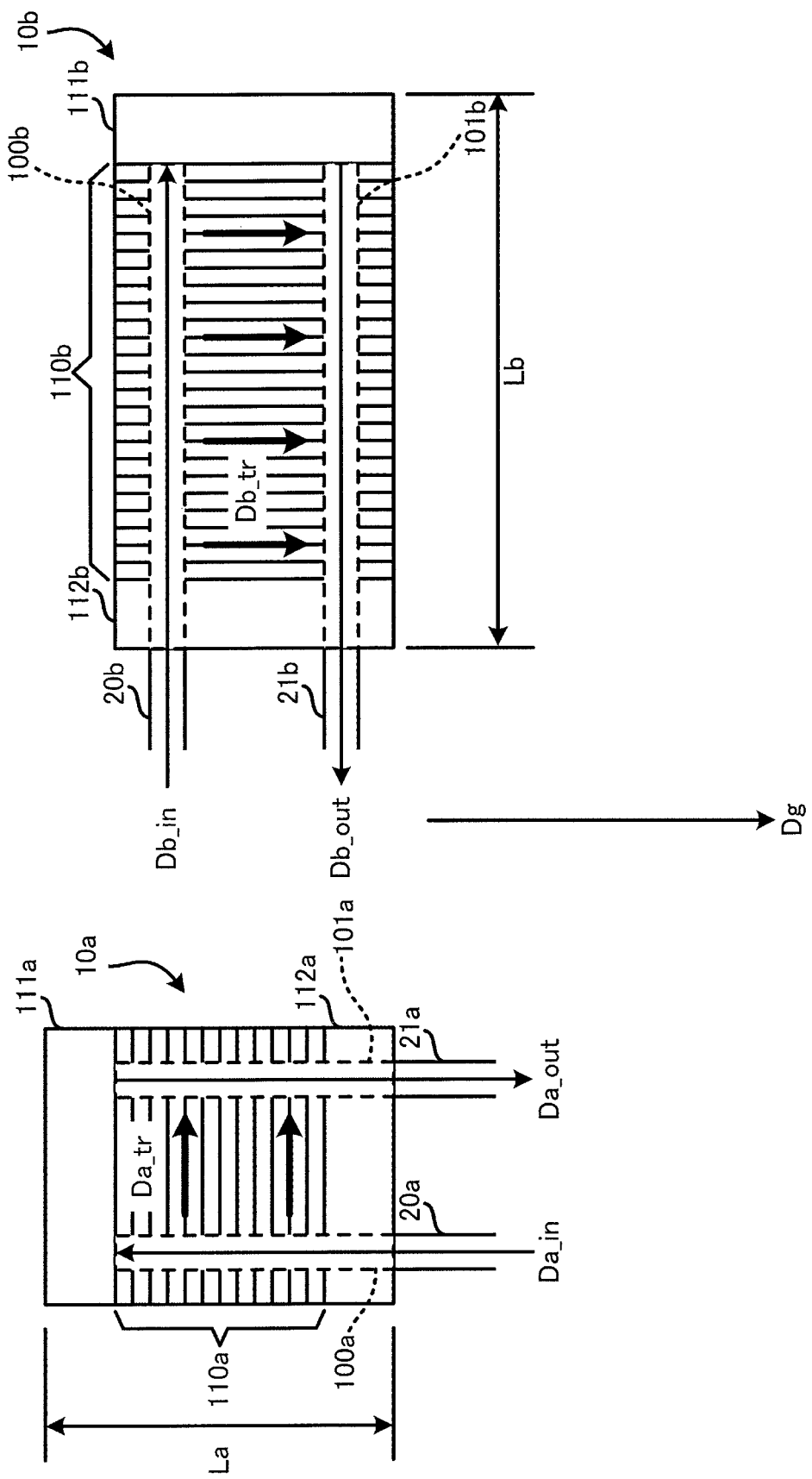
FIG. 6 is a view showing an arrangement example of fuel cell stacks having different numbers of unit cells.

FIG. 6 shows an arrangement example of the fuel cell stacks 10*a*, 10*b* having different numbers of unit cells 110*a*, 110*b*. In FIG. 6, the same reference numerals or symbols are assigned to the same components or directions as those of FIG. 4, and these components or directions will not be further described.

In this example, the discharge direction Da_out of the oxidant gas discharge manifold 101*a* of the fuel cell stack 10*a* coincides with the vertical downward direction Dg, and the discharge direction Db_out of the oxidant gas discharge manifold 101*b* of the fuel cell stack 10*b* coincides with the horizontal direction. Also, the number of the unit cells 110*a* of the fuel cell stack 10*a* is smaller than that of the unit cells 110*b* of the fuel cell stack 10*b*. Here, the size of the unit cell 110*a* is the same as that of the unit cell 110*b*.

Thus, the volume of oxidant gas passages of the fuel cell stack 10*a* having the smaller number of unit cells 110*a*, namely, the total volume of oxidant gas channels in the unit cells 110*a* and the oxidant gas discharge manifold 101*a*, is smaller than the volume of oxidant gas passages of the fuel cell stack 10*b* having the larger number of unit cells 110*b*. Accordingly, when the oxidant gas discharge manifolds 101*a*, 101*b* are subjected to scavenging operation under the same conditions, the amount of water in the oxidant gas discharge manifold 101*a* is smaller than that of water in the oxidant gas discharge manifold 101*b*.

Accordingly, the power generation capability of the fuel cell stack 10*a* at the start of power generation is higher than that of the example of FIG. 4.

Also, the length La of the fuel cell stack 10*a* having the smaller number of unit cells 110*a*, as measured in the stacking direction, is shorter than the length Lb of the fuel cell stack 10*b* having the larger number of unit cells 110*b*, as measured in the stacking direction. Accordingly, when the fuel cell stack 10*a* is oriented such that the stacking direction extends along the vertical downward direction Dg, and the fuel cell stack 10*b* is oriented such that the stacking direction extends along the horizontal direction, the height of the fuel cell stacks 10*a*, 10*b* is reduced to be lower than that in the case of the second arrangement example. With the height of the fuel cell stacks 10*a*, 10*b* thus reduced, the fuel cell stacks 10*a*, 10*b* can be installed under a fuel cell vehicle hood, for example.

In this connection, the arrangement of the fuel cell stacks 10*a*, 10*b* is not limited to that of the example of FIG. 6, but the stacking direction of the fuel cell stack 10*a* may shift from the vertical downward direction Dg, and the stacking direction of the fuel cell stack 10*b* may shift from the horizontal direction.

Scavenging Conditions of Fuel Cell Stacks 10*a*, 10*b*

In the scavenging operation of step St3 of FIG. 2 as described above, scavenging conditions of the fuel cell stack 10*a* may be identical with or different from those of the fuel cell stack 10*b*. Examples of the scavenging conditions include a length of time (which will be referred to as "scavenging time") for which the air compressor 30*a*, 30*b* delivers air, and the flow rate of the air.

The ECU 1 sets the scavenging conditions for the air compressors 30*a*, 30*b* in step St3 of FIG. 2. For example, the ECU 1 sets a scavenging time that is longer than that of the air compressor 30*b* of the fuel cell stack 10*b* that starts generating power later, for the air compressor 30*a* of the fuel cell stack 10*a* that starts generating power earlier. At this time, the ECU 1 sets the same flow rate for each air compressor 30*a*, 30*b*. As a result, the amount of water in the oxidant gas discharge manifold 101*a* of the fuel cell stack 10*a* that starts generating power earlier is further reduced; therefore, the power generation capability of the fuel cell stack 10*a* is enhanced, and the fuel cell stack 10*a* can sufficiently generate power, even below the freezing point, for example.

Unlike the above setting, the ECU 1 may set a flow rate that is higher than that of the air compressor 30*b* of the fuel cell stack 10*b* that starts generating power later, for the air compressor 30*a* of the fuel cell stack 10*a* that starts generating power earlier. At this time, if the ECU 1 sets the same scavenging time for the air compressors 30*a*, 30*b*, the air compressor 30*a* having the higher flow rate can discharge the larger amount of water than the air compressor 30*b* having the lower flow rate, so that substantially the same effect as that described above is obtained.

Further, the ECU 1 may set both of the scavenging time and the flow rate for the air compressor 30*a*, to greater values than those of the air compressor 30*b*. At this time, the air compressor 30*a* having the higher flow rate and the longer scavenging time can discharge the larger amount of water than the air compressor 30*b* having the lower flow rate and the shorter scavenging time; therefore, the above effect becomes more pronounced.

Further, the ECU 1 sets the scavenging conditions that enable the fuel cell stack 10*b* to sufficiently generate electric power at ordinary temperatures, for the air compressor 30*b* of the fuel cell stack 10*b* that starts generating power later. However, setting of the scavenging conditions is not limited to this, and the scavenging operation may not be performed. As a result, power consumption of the air compressors 30*a*, 30*b* needed for the scavenging operation is reduced.

Control Example of Start of Power Generation Based on Outside Air Temperature

As described above, when the fuel cell system 9 is re-started at a temperature below the freezing point, the power generation capability of the fuel cell stack 10*a* having the smaller amount of water in the oxidant gas discharge manifold 101*a* is higher than that of the fuel cell stack 10*b* having the larger amount of water in the oxidant gas discharge manifold 101*b*. However, when the fuel cell system 9 is re-started in a high-temperature environment, the electrolyte membranes in the unit cells 110*a*, 110*b* are more likely to dry as the amount of water in the oxidant gas discharge manifold 101*a*, 101*b* is smaller.

Therefore, the power generation capability of the fuel cell stack 10*a* having the smaller amount of water in the oxidant gas discharge manifold 101*a* is lower than that of the fuel cell stack 10*b* having the larger amount of water in the oxidant gas discharge manifold 101*b*, contrary to the case where the system is re-started at a temperature below the freezing point. Thus, as in the above example, the ECU 1 may select the fuel cell stack 10*a*, 10*b* that starts generating power earlier, according to the outside air temperature.

Figure 7:
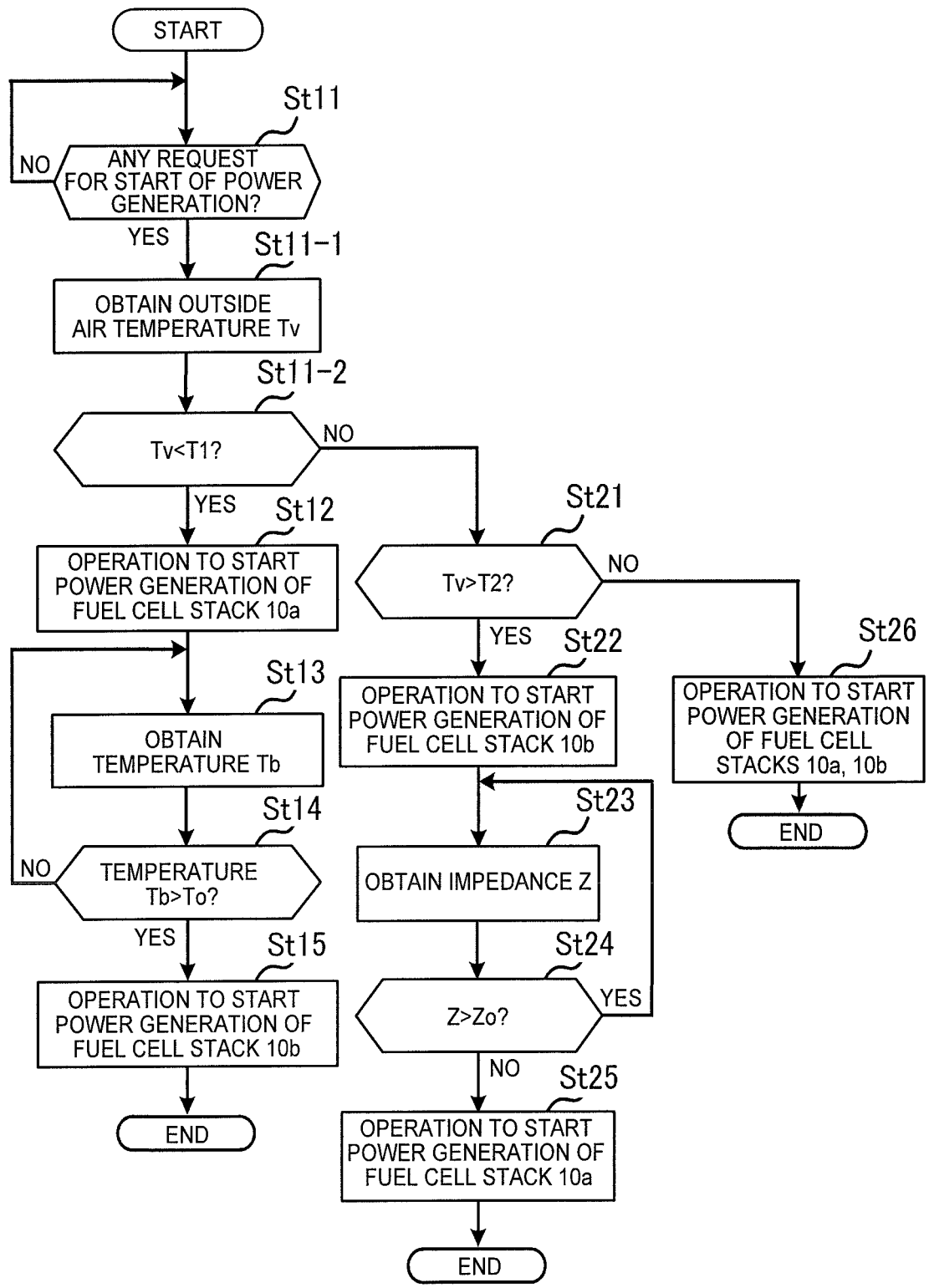
FIG. 7 is a flowchart illustrating one example of a re-starting process of the fuel cell system.

FIG. 7 is a flowchart illustrating one example of a re-starting process of the fuel cell system 9. In FIG. 7, the same step numbers are assigned to the same steps as those of FIG. 5, and these steps will not be further described.

When there is a request for start of power generation (YES in step St11), the ECU 1 obtains the outside air temperature Tv from the outside air temperature sensor 90 (step St11-1). Then, the ECU 1 compares the outside air temperature Tv with a threshold value T1 (step St11-2). Here, the threshold value T1, which is used for determining whether the environment of the fuel cell system 9 is below the freezing point, is set to 0 degree, for example. The threshold value T1 is one example of the first threshold value.

When the temperature Tv is lower than the threshold value T1 (Tv<T1) (YES in step St11-2), the ECU 1 determines that the fuel cell system 9 is placed in an environment below the freezing point, and performs operation to start power generation of the fuel cell stack 10a of which the discharge direction Da_out forms a smaller angle with the vertical downward direction Dg (step St12). Then, the ECU 1 performs operation to start power generation of the other fuel cell stack 10b (step St15). As a result, the above effect is obtained.

When the temperature Tv is equal to or higher than the threshold value T1 (Tv≥T1) (NO in step St11-2), the ECU 1 determines that the fuel cell system 9 is not placed in an environment below the freezing point, and compares the outside air temperature Tv with a threshold value T2 (step St21). The threshold value T2 is larger than the threshold value T1, and is set to a temperature at which the electrolyte membranes in the unit cells 110a, 110b may be dried.

When the temperature Tv is higher than the threshold value T2 (Tv>T2) (YES in step St21), the ECU 1 determines that the fuel cell system 9 is in a high-temperature environment, and performs operation to start power generation of the fuel cell stack 10b of which the discharge direction Db_out forms a larger angle with the vertical downward direction Dg (step St22). Since the amount of water in the oxidant gas discharge manifold 101b of the fuel cell stack 10b is larger than that of water in the oxidant gas discharge manifold 101a of the other fuel cell stack 10a, the unit cells 110b of the fuel cell stack 10b are less likely to be dried than the unit cells 110a of the fuel cell stack 10a, in the high-temperature environment.

Therefore, the power generation capability of the fuel cell stack 10b is higher than that of the fuel cell stack 10a. Accordingly, the ECU 1 can reduce wasteful power consumption of the air compressor 30a and the injector 36a, by causing the fuel cell stack 10b having the higher power generation capability to start generating power earlier than the other fuel cell stack 10a.

Then, the ECU 1 obtains the impedance Z of the fuel cell stack 10a from an impedance measuring device (not shown), for example, so as to determine whether the fuel cell stack 10a that has not generated power can start generating power (step St23). The impedance Z changes according to dry conditions of the electrolyte membranes of the unit cells 110a, and assumes a larger value as the degree of dryness is higher.

Then, the ECU 1 compares the impedance Z with a predetermined impedance Zo (step St24). When the impedance Z is larger than the predetermined impedance Zo (Z>Zo) (YES in step St24), the ECU 1 determines that the electrolyte membranes of the unit cells 110a remain dried, and executes step St23 again. In order to eliminate the dry conditions of the unit cells 110a, water produced through power generation of the fuel cell stack 10a that is generating power, for example, may be supplied to the cathode supply channel 20b of the fuel cell stack 10b that has not generated power. As a result, the time required to eliminate the dry conditions of the unit cells 110a is reduced to be shorter than that in the case where no water is supplied to the cathode supply channel 20b.

In step St23, the ECU 1 may determine the dry conditions of the unit cells 110a, in place of the impedance Z, by obtaining the humidity in the oxidant gas supply manifold 100a of the fuel cell stack 10a that has not generated power, from a hygrometer (not shown). In this case, the ECU 1 can determine that the dry conditions of the unit cells 110a have been eliminated, when the obtained humidity is higher than a predetermined threshold value.

When the impedance Z is equal to or smaller than the predetermined impedance Zo (Z≤Zo) (NO in step St24), the ECU 1 determines that the electrolyte membranes of the unit cells 110a cease to be in the dry conditions, and performs operation to start power generation of the fuel cell stack 10a (step St25). When freezing of water in the oxidant gas discharge manifold 101a is eliminated, liquid water from melted ice flows from the oxidant gas discharge manifold 101a into the humidifier 34a, so that the oxidant gas flowing in the cathode supply channel 20a is humidified by the humidifier 34a. When the humidified oxidant gas reaches the electrolyte membranes of the unit cells 110a, the dry conditions of the electrolyte membranes of the unit cells 110a are eliminated, so that the power generation capability of the fuel cell stack 10a is enhanced.

When the temperature Tv is equal to or lower than the threshold value T2 (Tv≤T2) (NO in step St21), the ECU 1 determines that the environment of the fuel cell system 9 is neither below the freezing point, nor the high-temperature environment, and performs operation to start power generation of the fuel cell stacks 10a, 10b (step St26). In this case, the ECU 1 determines that there is no substantial difference between the power generation capability of the fuel cell stack 10a and that of the fuel cell stack 10b. In this manner, the re-starting process of the fuel cell system 9 is carried out.

Thus, when the outside air temperature Tv of the fuel cell stacks 10a, 10b is lower than the threshold value T1, the ECU 1 controls the air compressors 30a, 30b and the injectors 36a, 36b, so that one of the fuel cell stacks 10a starts generating power earlier than the other fuel cell stack 10b. Thus, when the fuel cell system 9 is re-started in an environment below the freezing point, for example, the fuel cell stack 10b having the lower power generation capability starts generating power later than the fuel cell stack 10a having the higher power generation capability, so that wasteful power consumption of the air compressor 30b and the injector 36b is reduced.

Also, when the outside air temperature Tv is higher than the threshold value T2 that is higher than the threshold value T1, the ECU 1 controls operation of the air compressors 30a, 30b and the injectors 36a, 36b, so that one of the fuel cell stacks 10a starts generating power later than the other fuel cell stack 10b. Thus, when the fuel cell system 9 is re-started in a high-temperature environment, for example, the fuel cell stack 10a having the lower power generation capability starts generating power later than the fuel cell stack 10b having the higher power generation capability, so that wasteful power consumption of the air compressor 30a and the injector 36a is reduced.

While the ECU 1 obtains the outside air temperature Tv from the outside air temperature sensor 90, the method of obtaining the temperature Tv is not limited to this. For example, the ECU 1 may obtain the coolant temperatures Ta, Tb of the fuel cell stacks 10a, 10b from the temperature sensors 91a, 91b, respectively, and may estimate the outside air temperature Tv from the coolant temperatures Ta, Tb.

Re-Starting Process According to Inclination of Vehicle Body of Fuel Cell Vehicle In each of the illustrated embodiments, the angles θa, θb of the discharge directions Da_out, Db_out of the respective fuel cell stacks 10a, 10b, relative to the vertical downward direction Dg, are constant. However; the angles θa, θb may be changed. For example, the relationship in magnitude of the angles θa, θb of the oxidant gas discharge manifolds 101a, 101b of the fuel cell stacks 10a, 10b, relative to the vertical downward direction Dg, may be reversed, depending on the inclination of the vehicle body of the fuel cell vehicle. Thus, the ECU 1 may select the fuel cell stack 10a, 10b that starts generating power first, according to the inclination of the vehicle body.

Figure 8:
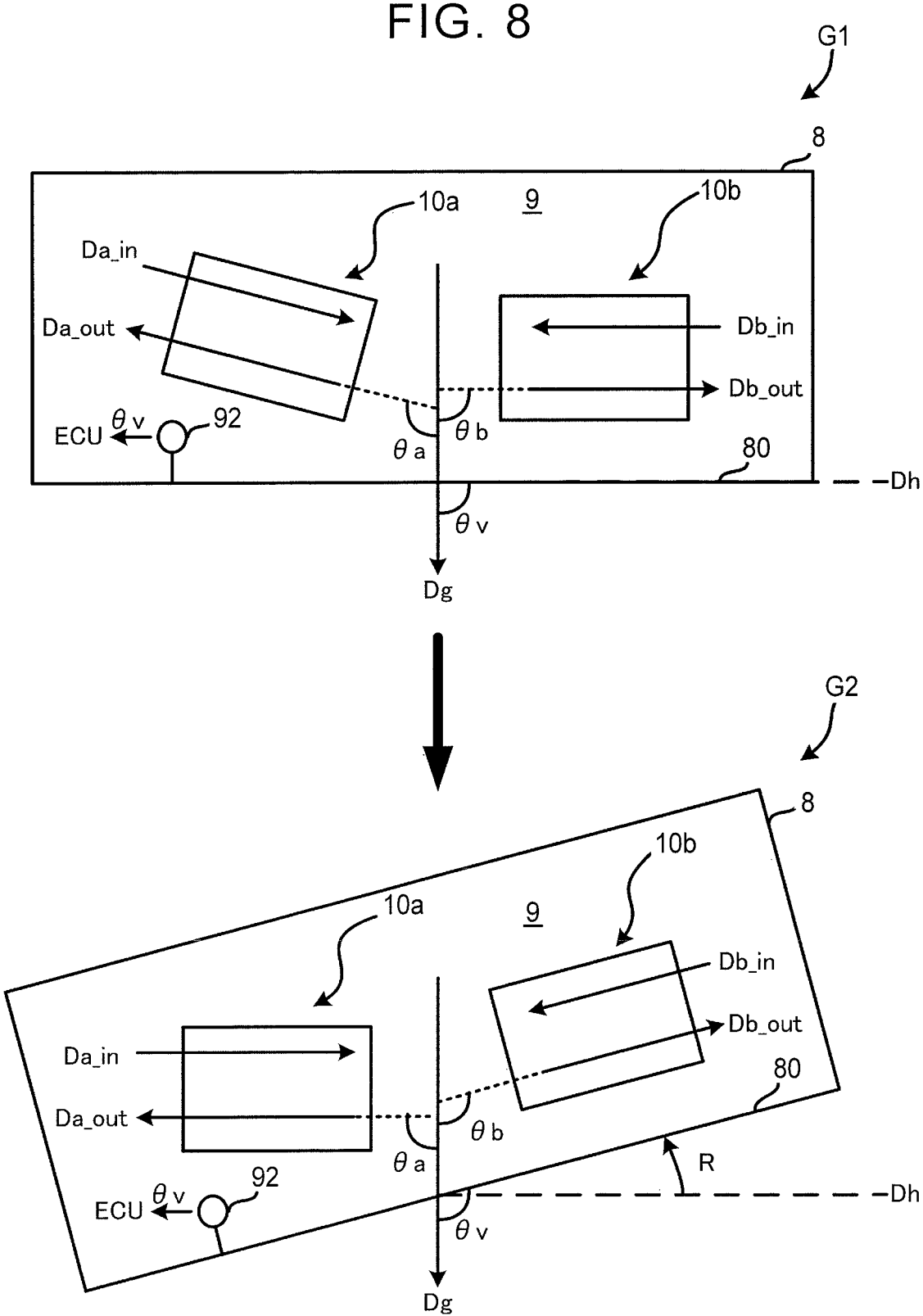
FIG. 8 is a view showing one example of arrangement of fuel cell stacks when a vehicle body of a fuel cell vehicle on which the fuel cell system is installed is inclined from a horizontal direction.

FIG. 8 shows one example of arrangement of the fuel cell stacks 10a, 10b in the case where the vehicle body 8 of the fuel cell vehicle on which the fuel cell system 9 is installed is inclined from the horizontal direction Dh. In this example, the fuel cell stacks 10a, 10b are installed on the vehicle body 8, such that the angles of the discharge directions Da_out, Db_out relative to the vehicle body 8 of the fuel cell vehicle are different from each other.

In FIG. 8, "G1" shows a condition of the fuel cell stacks 10a, 10b when the posture of the vehicle body 8 is kept in the horizontal direction Dh, and "G2" shows a condition of the fuel cell stacks 10a, 10b when the posture of the vehicle body 8 is inclined (see "R") from the horizontal direction Dh. Examples of the case where the vehicle body 8 is inclined include the case where the fuel cell vehicle is stopped on a slope.

When the posture of the vehicle body 8 is kept in the horizontal direction Dh, the angle θa of the oxidant gas discharge direction Da_out of the fuel cell stack 10a, relative to the vertical downward direction Dg, is larger than 90 degrees, and the angle θb of the oxidant gas discharge direction Db_out of the fuel cell stack 10b, relative to the vertical downward direction Dg, is equal to 90 degrees. Thus, the relationship that the angle θa is larger than the angle θb (θa>θb) is satisfied.

On the other hand, when the posture of the vehicle body 8 is inclined from the horizontal direction Dh, the angle θa of the oxidant gas discharge direction Da_out of the fuel cell stack 10a, relative to the vertical downward direction Dg, is 90 degrees, and the angle θb of the oxidant gas discharge direction Db_out of the fuel cell stack 10b, relative to the vertical downward direction Dg, is larger than 90 degrees. Thus, the relationship that the angle θa is smaller than the angel θb (θa<θb) is satisfied.

Thus, when the vehicle body 8 is inclined, the relationship between the angle θa and the angle θb may be reversed. In this case, if the relationship between the angle θa and the angle θb cannot be detected, the ECU 1 cannot determine which of the fuel cell stacks 10a, 10b can start generating power earlier.

Thus, the fuel cell system 9 is provided with an inclination sensor 92 that detects inclination of the vehicle body 8. The inclination sensor 92, which is provided on a bottom plate portion 80 of the vehicle body 8, for example, detects an angle θv of the bottom plate portion 80 relative to the vertical downward direction Dg, for example, and informs the ECU 1 of the detected angle θv. The inclination sensor 92 is one example of the second detector.

The ECU 1 determines which of the fuel cell stacks 10a, 10b has the discharge direction Da_out, Db_out that forms a smaller angle with the vertical downward direction Dg, based on the inclination of the vehicle body 8 detected by the inclination sensor 92. Therefore, even when the vehicle body 8 is inclined, the ECU 1 can select the fuel cell stack 10a, 10b that starts generating power first, according to the inclination of the vehicle body detected by the inclination sensor 92.

In the case where the angles of the respective fuel cell stacks 10a, 10b relative to the vehicle body 8 are equal to each other, too, the ECU 1 can select the fuel cell stack 10a, 10b that starts generating power first, according to the inclination of the vehicle body detected by the inclination sensor 92.

FIG. 9 shows another example of arrangement of the fuel cell stacks 10a, 10b in the case where the vehicle body 8 of the fuel cell vehicle on which the fuel cell system 9 is installed is inclined from the horizontal direction Dh. In FIG. 9, the same reference numerals or symbols are assigned to the same components or directions as those of FIG. 8 and these components or directions will not be further described.

In FIG. 9, "G11" shows a condition of the fuel cell stacks 10a, 10b when the posture of the vehicle body 8 is kept in the horizontal direction Dh, and "G12" shows a condition of the fuel cell stacks 10a, 10b when the posture of the vehicle body 8 is inclined from the horizontal direction Dh.

In this example, the fuel cell stacks 10a, 10b are arranged such that their discharge directions Da_out, Db_out are opposite to each other, namely, the angle formed by the discharge directions Da_out, Db_out is 180 degrees. Also, the fuel cell stacks 10a, 10b are arranged such that the discharge directions Da_out, Db_out are in parallel with the horizontal direction Dh.

With this arrangement, when the posture of the vehicle body 8 is kept in the horizontal direction Dh, the angles θa, θb of the discharge directions Da_out, Db_out are both 90 degrees. Namely, the relationship that the angle θa is equal to the angle θb (θa=θb) is satisfied. At this time, the ECU 1 causes both the fuel cell stacks 10a, 10b to start generating power, based on the angle θv of the vehicle body 8 detected by the inclination sensor 92.

On the other hand, when the posture of the vehicle body 8 is inclined from the horizontal direction Dh, the angle θa of the discharge direction Da_out becomes smaller than 90 degrees, and the angle θb of the discharge direction. Db_out becomes larger than 90 degrees. Thus, the relationship that the angle θa is smaller than the angle θb (θa<θb) is satisfied. At this time, the ECU 1 causes the fuel cell stack 10b to start generating power, after causing the fuel cell stack 10a to start generating power, based on the angle θv of the vehicle body 8 detected by the inclination sensor 92.

Figure 10:
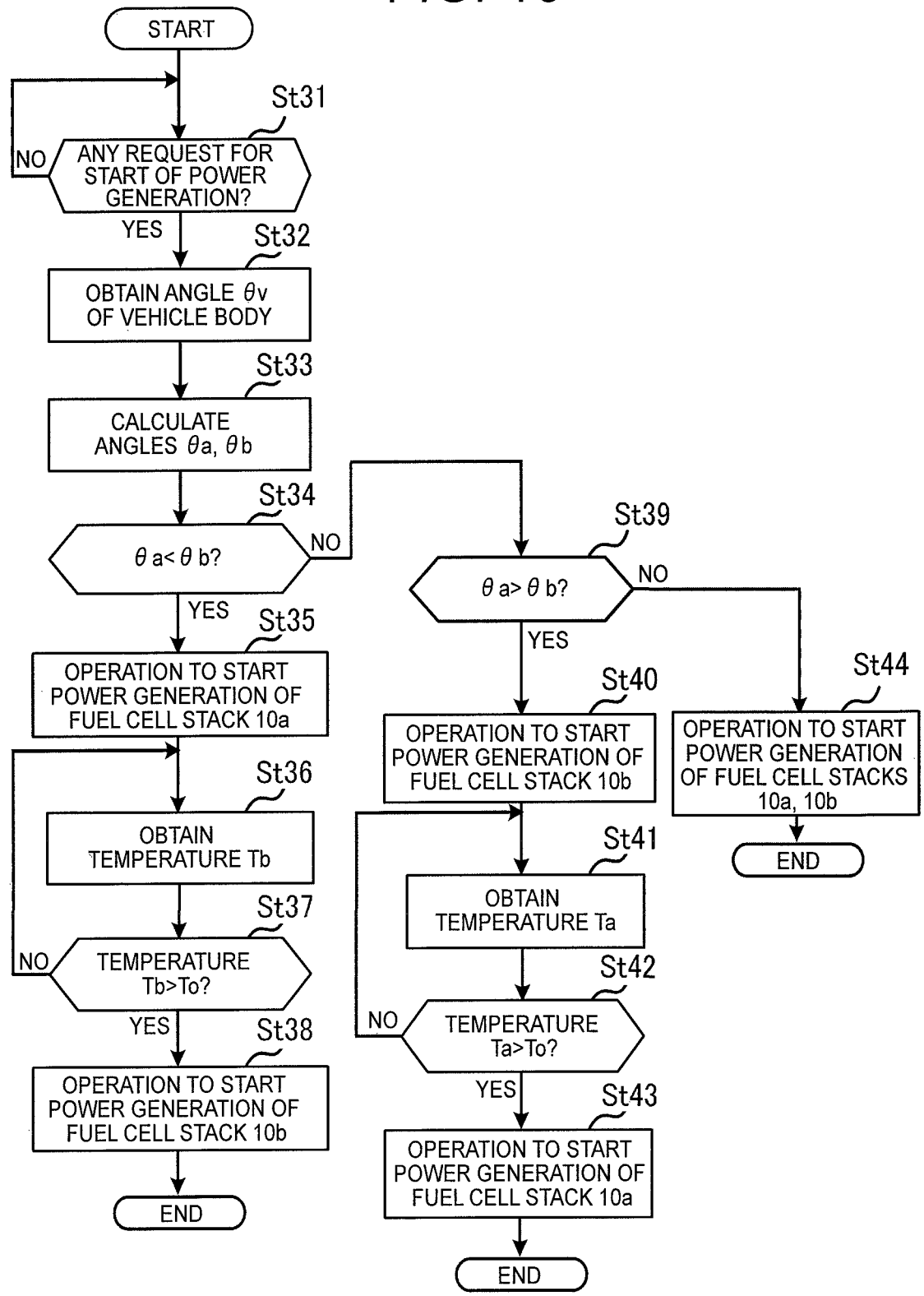
FIG. 10 is a flowchart illustrating one example of a re-starting process of the fuel cell system, based on inclination of the vehicle body detected by an inclination sensor.

FIG. 10 is a flowchart illustrating one example of the re-starting process of the fuel cell system 9, based on the inclination of the vehicle body 8 detected by the inclination sensor 92. The ECU 1 determines whether there is a request for start of power generation (step St31). When there is no request for start of power generation (NO in step St31), the ECU 1 executes step St31 again.

When there is a request for start of power generation (YES in step St31), the ECU 1 obtains the angle θv of the vehicle body 8 from the inclination sensor 92 (step St32). Then, the ECU 1 calculates the angles θa, θb of the discharge directions Da_out, Db_out from the angle θv of the vehicle body 8 (step St33). The angles θa, θb are calculated from map data of the correspondence relationship of the angles θa, θb, θv, for example.

Then, the ECU 1 determines whether the angle θa is smaller than the angle θb (θa<θb) (step St34). When the angle θa is smaller than the angle θb (YES in step St34), the ECU 1 causes the fuel cell stack 10a to start generating power (step St35). Then, the ECU 1 obtains the temperature Tb of the coolant from the temperature sensor 91b (step St36), and compares the temperature Tb with a predetermined temperature To (step St37).

When the temperature Tb is equal to or lower than the predetermined temperature To (Tb≤To) (NO in step St37), the ECU 1 executes step St36 again. When the temperature Tb is higher than the predetermined temperature To (Tb>To) (YES in step St37), the ECU 1 causes the fuel cell stack 10b to start generating power (step St38). The tasks of steps St35 to St38 are substantially identical with those of steps St12 to St15 as described above.

When the angle θa is larger than the angle θb (θa>θb) (NO in step St34, YES in step St39), the ECU 1 performs operation to start power generation of the fuel cell stack 10b (step St40). Then, the ECU 1 obtains the temperature Ta of the coolant from the temperature sensor 91a (step St41), and compares the temperature Ta with a predetermined temperature To (step St42).

When the temperature Ta is equal to or lower than the predetermined temperature To (Ta≤To) (NO in step St42), the ECU 1 executes step St41 again. When the temperature Ta is higher than the predetermined temperature To (Ta>To) (YES in step St42), the ECU 1 performs operation to start power generation of the fuel cell stack 10a (step St43). The tasks of steps St40 to St43 are substantially identical with those of steps St22 to St25 as described above.

When the angle θa is equal to the angle θb (θa=θb) (NO in step St39), the ECU 1 performs operation to start power generation of the fuel cell stacks 10a, 10b (step St44). In this manner, the re-starting process of the fuel cell system 9 is carried out.

Thus, the ECU 1 determines which of the fuel cell stacks 10a, 10b has the discharge direction Da_out, Db_out that forms a smaller angle with the vertical downward direction Dg, based on the inclination detected by the inclination sensor 92. Thus, even when the vehicle body 8 of the fuel cell vehicle on which the fuel cell system 9 is installed is inclined, the ECU 1 can select the fuel cell stack 10a, 10b that starts generating power earlier.

Also, the fuel cell stacks 10a, 10b may be installed on the vehicle body 8 such that the angles of the discharge directions Da_out, Db_out relative to the vehicle body 8 of the fuel cell vehicle are different from each other, as in the example shown in FIG. 8. In this case, when the vehicle body 8 is inclined, the ECU 1 can select the fuel cell stack 10a, 10b that starts generating power earlier, according to the inclination detected by the inclination sensor 92, even when the relationship in magnitude between the angles θa, θb of the discharge directions Da_out, Db_out relative to the vertical downward direction Dg is reversed.

Also, the fuel cell stacks 10a, 10b may be installed on the vehicle body 8 such that the angles of the discharge directions Da_out, Db_out relative to the vehicle body 8 of the fuel cell vehicle are equal to each other, as in the example shown in FIG. 9. In this case, when the vehicle body 8 is inclined, the ECU 1 can select the fuel cell stack 10a, 10b that starts generating power earlier, according to the inclination detected by the inclination sensor 92, even when a difference arises between the angles θa, θb of the discharge directions Da_out, Db_out relative to the vertical downward direction Dg.

In this example, the ECU 1 selects the fuel cell stack 10a, 10b that starts generating power earlier, based on the detection result of the inclination sensor 92 that detects the inclination of the vehicle body 8. However, an inclination sensor that detects inclination of at least one of the fuel cell stacks 10a, 10b may be used.

Figure 11:
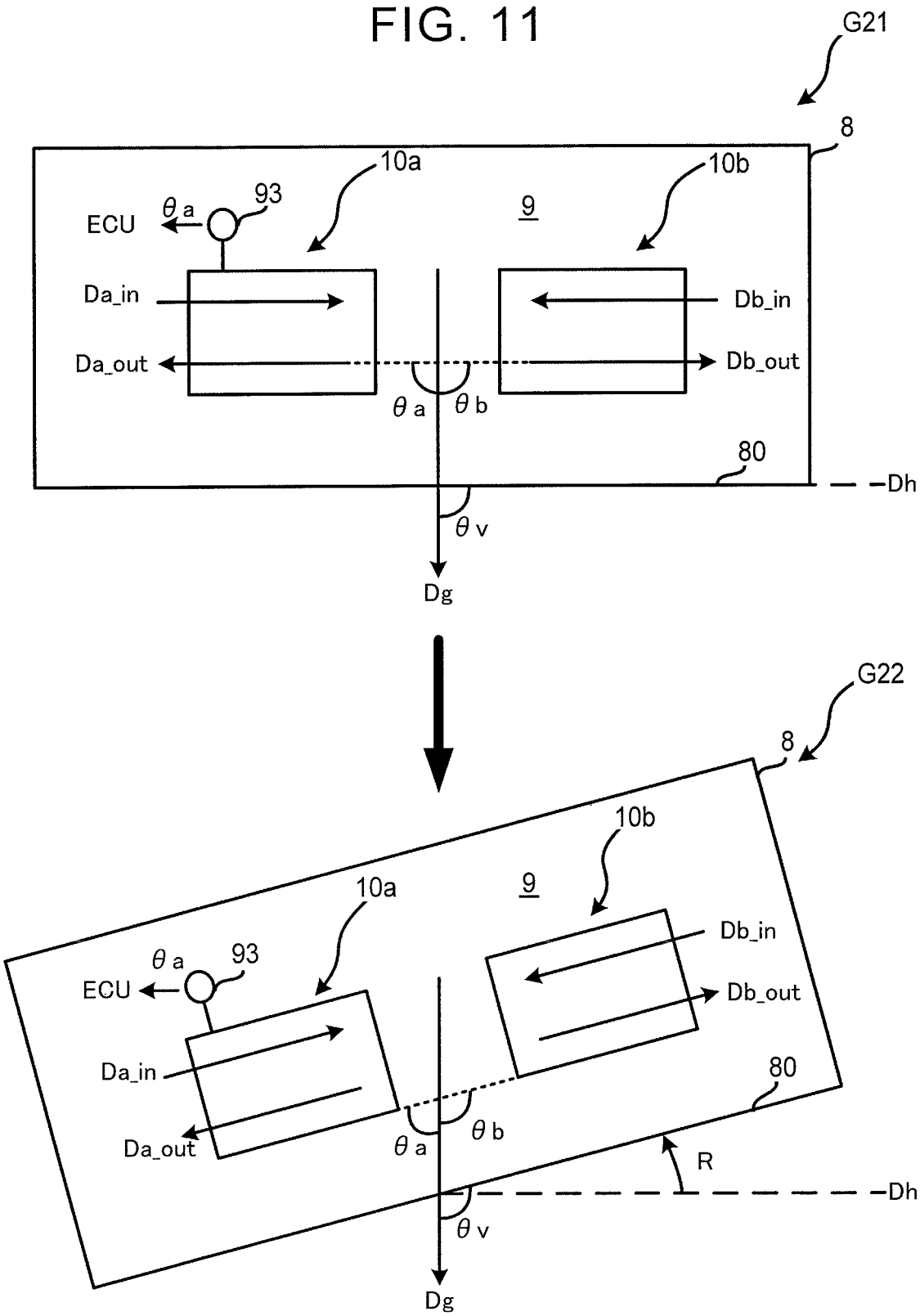
FIG. 11 is a view showing another example of arrangement of fuel cell stacks when the vehicle body of the fuel cell vehicle on which the fuel cell system is installed is inclined from the horizontal direction.

FIG. 11 shows another example of arrangement of the fuel cell stacks 10a, 10b in the case where the vehicle body 8 of the fuel cell vehicle on which the fuel cell system 9 is installed is inclined from the horizontal direction Dh. In FIG. 11, the same reference numerals or symbols are assigned to the same components or directions as those of FIG. 9, and these components or directions will not be further described.

In FIG. 11, "G21" shows a condition of the fuel cell stacks 10a, 10b when the posture of the vehicle body 8 is kept in the horizontal direction Dh, and "G22" shows a condition of the fuel cell stacks 10a, 10b when the posture of the vehicle body 8 is inclined from the horizontal direction Dh.

In this example, the fuel cell system 9 has an inclination sensor 93 that detects inclination of the discharge direction Da_out of the fuel cell stack 10a relative to the vertical downward direction Dg, in place of the inclination sensor 92 that detects inclination of the vehicle body 8. The inclination sensor 93 detects the angle θa of the discharge direction Da_out relative to the vertical downward direction Dg, and informs the ECU 1 of the detected angle θa. The inclination sensor 93 is one example of the first detector.

The ECU 1 calculates the angle θb of the discharge direction Db_out of the other fuel cell stack 10b, from the angle θa detected by the inclination sensor 93. In this example, the angle θb is calculated by subtracting the angle θa from 180 degrees. The ECU 1 selects the fuel cell stack 10a, 10b that starts generating power earlier, from the result of comparison of the angles θa, θb.

Figure 12:
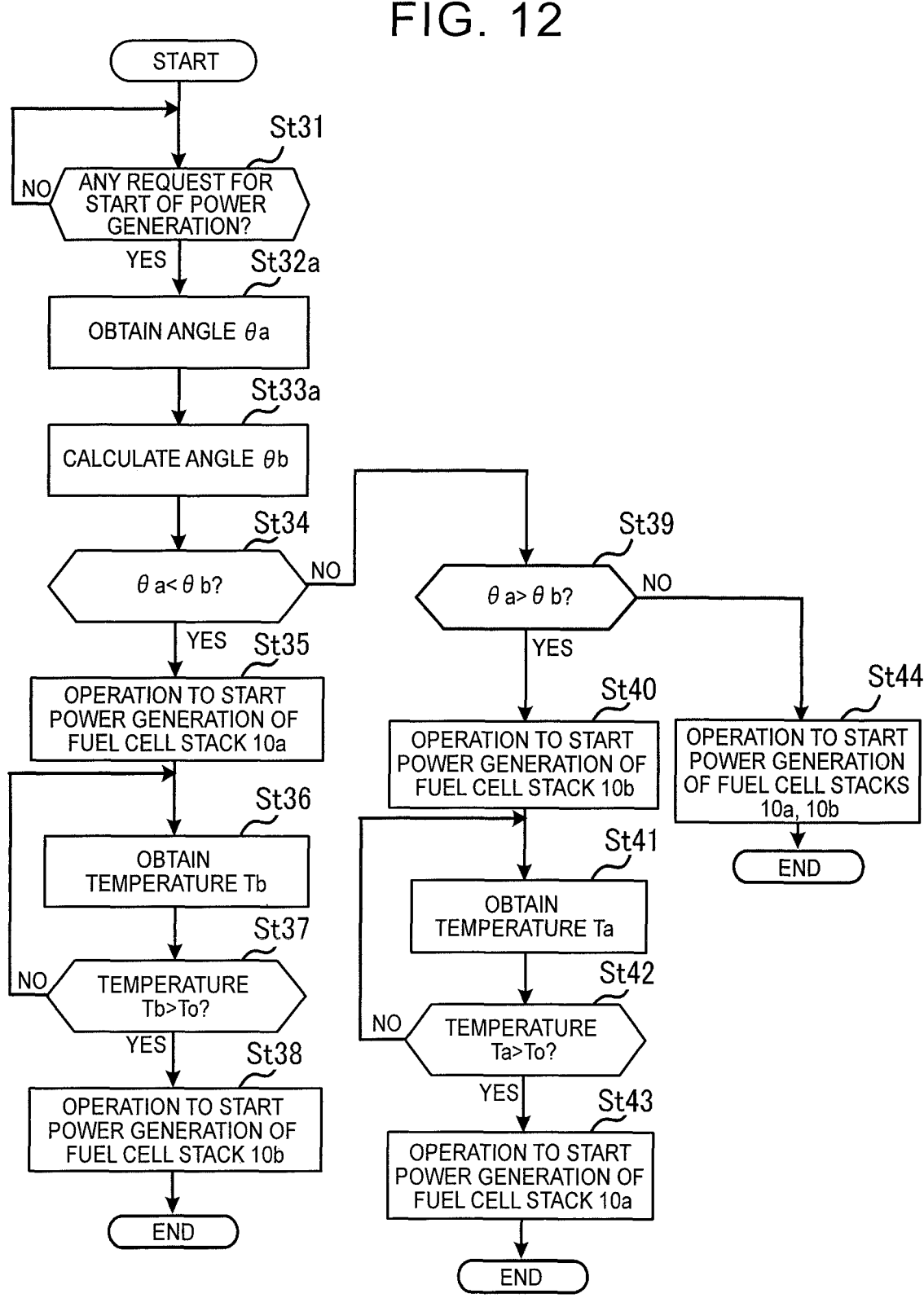
FIG. 12 is a flowchart illustrating one example of a re-starting process of the fuel cell system, based on an angle of a discharge direction detected by an inclination sensor.

FIG. 12 is a flowchart illustrating one example of there-starting process of the fuel cell system 9, based on the angle θa of the discharge direction Da_out detected by the inclination sensor 93. In FIG. 12, the same reference numerals or symbols are assigned to the same components or directions as those of FIG. 10, and these components or directions will not be further described.

When there is a request for start of power generation (YES in step St31), the ECU 1 obtains the angle θa of the discharge direction Da_out from the inclination sensor 93 (step St32a). Then, the ECU 1 calculates the angle θb of the discharge direction Db_out of the other fuel cell stack 10b from the angle θa (step St33a). The angle θb is calculated from the correlation (e.g., θb=180−θa) of the angles θa, θb determined when the fuel cell stacks 10a, 10b are installed.

Then, step St34 and subsequent steps are executed. In this manner, the re-starting process of the fuel cell system 9 is carried out.

Thus, the ECU 1 determines which of the fuel cell stacks 10a, 10b has the discharge direction Da_out, Db_out that forms a smaller angle with the vertical downward direction Dg, based on the inclination detected by the inclination sensor 93. Therefore, even when the vehicle body 8 of the fuel cell vehicle on which the fuel cell system 9 is installed is inclined, the ECU 1 can select the fuel cell stack 10a, 10b that starts generating power earlier.

While the inclination sensor 93 detects the angle θa of the discharge direction Da_out of the fuel cell stack 10a in this example, another inclination sensor that detects the angle θb of the discharge direction Db_out of the other fuel cell stack 10b may be provided, in addition to the inclination sensor 93, or in place of the inclination sensor 93. When the inclination sensor for detecting the angle θb is added, the task of calculating the angle θb (step St33a) is not needed.

Further, in this case, when there is no inclination sensor 93, a task of calculating the angle θa from the angle θb is performed.

While the fuel cell stacks 10a, 10b of each example as described above are arranged such that the discharge directions Da_out, Db_out point in mutually opposite directions, the arrangement is not limited to this, but the fuel cell stacks 10a, 10b may be arranged such that the discharge directions Da_out, Db_out are opposed to each other. Further, the fuel cell stacks 10a, 10b may be arranged such that the discharge directions Da_out, Db_out form 90 degrees on a surface of the bottom plate portion 80.

Example of Three Fuel Cell Stacks

While the ECU 1 controls start of power generation of two fuel cell stacks 10a, 10b, in each of the above examples, control similar to this control may be performed on a fuel cell system 9 including three fuel cell stacks.

FIG. 13 shows one example of arrangement of three fuel cell stacks 10a to 10c. The fuel cell stack 10c is included in a power generation system (not shown) similar to the first and second power generation systems 9a, 9b of the other fuel cell stacks 10a, 10b.

The discharge directions Da_out to Dc_out of the fuel cell stacks 10a to 10c form angles θa to θc, respectively, with the vertical downward direction Dg. When the relationship of angles θa>θb>θc is satisfied, the ECU 1 initially causes the fuel cell stack 10c having the smallest angle θc to start generating power first, then causes the fuel cell stack 10b having the angle θb to start generating power, and finally causes the fuel cell stack 10a having the largest angle θa to start generating power.

In this manner, when the fuel cell system 9 is started at a temperature below the freezing point, for example, the fuel cell stacks 10a to 10c can start generating power in descending order of the power generation capability; therefore, wasteful power consumption during re-start of the fuel cell system 9 is reduced. In this connection, the ECU 1 may cause the fuel cell stack 10b having the second largest angle θb to start generating power first. In this case, since the power generation capability of the fuel cell stack 10b is higher than that of at least the fuel cell stack 10a, wasteful power consumption during re-start of the fuel cell system 9 is reduced.

In each of the above examples, the order in which the fuel cell stacks 10a, 10b start generating power is determined, according to the discharge directions Da_out, Db_out of the oxidant gas discharge manifolds 101a, 101b. However, the manner of determining the order is not limited to this. For example, the ECU 1 may determine the order in which the fuel cell stacks 10a, 10b start generating power, according to the discharge directions of the fuel gas discharged from the fuel gas discharge manifolds 103a, 103b.

Even when the scavenging operation is performed, water remains in the fuel gas discharge manifolds 103a, 103b, as in the oxidant gas discharge manifolds 101a, 101b. The ease of discharge of water depends on the angle of the discharge direction of the fuel gas relative to the vertical downward direction Dg. Thus, the amount of water in the fuel gas discharge manifold 103a, 103b of one of the fuel cell stacks 10a, 10b of which the discharge direction of the fuel gas forms a smaller angle with the vertical downward direction Dg is smaller than the amount of water in the fuel gas discharge manifold 103b, 103a of the other fuel cell stack 10b, 10a.

Accordingly, the power generation capability of the fuel cell stack 10a, 10b of which the discharge direction of the fuel gas forms the smaller angle with the vertical downward direction Dg is higher than that of the other fuel cell stack, at temperatures below the freezing point, for example. Thus, the ECU 1 causes the fuel cell stack 10a, 10b of which the discharge direction of the fuel gas forms the smaller angle with the vertical downward direction Dg to start generating power earlier than the other fuel cell stack 10b, 10a. As a result, substantially the same effect as that described above is obtained.

The above embodiments are preferred embodiments of the disclosure. It is, however, to be understood that the disclosure is not limited to the embodiments, but may be embodied with various modifications, without departing from the principle of the disclosure.

What is claimed is:

1. A fuel cell system comprising:
a first fuel cell stack configured to generate electric power through chemical reaction of reaction gas, the first fuel cell stack having a discharge manifold configured to discharge the reaction gas;
a second fuel cell stack configured to generate electric power through chemical reaction of reaction gas, the second fuel cell stack having a discharge manifold configured to discharge the reaction gas;
a first auxiliary machine used for power generation of the first fuel cell stack;
a second auxiliary machine used for power generation of the second fuel cell stack; and
a controller configured to control operation of the first auxiliary machine and the second auxiliary machine,
wherein the controller is programmed to control operation of the first auxiliary machine and the second auxiliary machine, such that one fuel cell stack of the first fuel cell stack and the second fuel cell stack, of which a discharge direction of the reaction gas discharged from the discharge manifold forms a smaller angle with a vertical downward direction, starts generating power earlier than the other fuel cell stack of the first fuel cell stack and the second fuel cell stack, after power generation of the first fuel cell stack and the second fuel cell stack is stopped.

2. The fuel cell system according to claim 1, wherein the controller is programmed to control operation of the first auxiliary machine and the second auxiliary machine, such that the one fuel cell stack starts generating power earlier than the other fuel cell stack, when an outside air temperature is lower than a first threshold value.

3. The fuel cell system according to claim 1, wherein the controller is programmed to control operation of the first auxiliary machine and the second auxiliary machine, such that the other fuel cell stack starts generating power, when a temperature of the other fuel cell stack becomes higher than a second threshold value, after the one fuel cell stack starts generating power.

4. The fuel cell system according to claim 1, wherein the discharge direction of the one fuel cell stack substantially coincides with the vertical downward direction.

5. The fuel cell system according to claim 1, wherein:
the first fuel cell stack has a plurality of unit cells;
the second fuel cell stack has a plurality of unit cells; and
the number of the unit cells of the one fuel cell stack is smaller than the number of the unit cells of the other fuel cell stack.

6. The fuel cell system according to claim 1, wherein:
the first auxiliary machine is configured to deliver scavenging gas to the discharge manifold of the first fuel cell stack, to scavenge the discharge manifold, after power generation of the first fuel cell stack is stopped;

the second auxiliary machine is configured to deliver scavenging gas to the discharge manifold of the second fuel cell stack, to scavenge the discharge manifold, after power generation of the second fuel cell stack is stopped; and one auxiliary machine of the first auxiliary machine and the second auxiliary machine which scavenges the discharge manifold of the one fuel cell stack delivers the scavenging gas for a longer time than the other auxiliary machine of the first auxiliary machine and the second auxiliary machine which scavenges the discharge manifold of the other fuel cell stack, at substantially the same flow rate as the other auxiliary machine.

7. The fuel cell system according to claim 1, wherein:

the first auxiliary machine is configured to deliver scavenging gas to the discharge manifold of the first fuel cell stack, to scavenge the discharge manifold, after power generation of the first fuel cell stack is stopped;

the second auxiliary machine is configured to deliver scavenging gas to the discharge manifold of the second fuel cell stack, to scavenge the discharge manifold, after power generation of the second fuel cell stack is stopped; and one of the first auxiliary machine and the second auxiliary machine which scavenges the discharge manifold of the one fuel cell stack delivers the scavenging gas at a higher flow rate than the other of the first auxiliary machine and the second auxiliary machine which scavenges the discharge manifold of the other fuel cell stack, within a predetermined time.

8. The fuel cell system according to claim 1, wherein:

the first auxiliary machine is configured to deliver scavenging gas to the discharge manifold of the first fuel cell stack, to scavenge the discharge manifold, after power generation of the first fuel cell stack is stopped;

the second auxiliary machine is configured to deliver scavenging gas to the discharge manifold of the second fuel cell stack, to scavenge the discharge manifold, after power generation of the second fuel cell stack is stopped; and one auxiliary machine of the first auxiliary machine and the second auxiliary machine which scavenges the discharge manifold of the one fuel cell stack delivers the scavenging gas for a longer time than the other auxiliary machine of the first auxiliary machine and the second auxiliary machine which scavenges the discharge manifold of the other fuel cell stack, at a higher flow rate than the other auxiliary machine.

9. The fuel cell system according to claim 1, further comprising:

a first detector configured to detect an inclination of the discharge direction of the first fuel cell stack or the second fuel cell stack relative to the vertical downward direction, wherein the controller is programmed to determine which of the first fuel cell stack and the second fuel cell stack has the discharge direction that forms a smaller angle with the vertical downward direction, based on the inclination detected by the first detector.

10. The fuel cell system according to claim 1, further comprising:

a second detector configured to detect an inclination of a vehicle on which the fuel cell system is installed, wherein the controller is programmed to determine which of the first fuel cell stack and the second fuel cell stack has the discharge direction that forms a smaller angle with the vertical downward direction, based on the inclination detected by the second detector.

11. The fuel cell system according to claim 10, wherein the first fuel cell stack and the second fuel cell stack are installed on a vehicle body of the vehicle, such that an angle of the discharge direction of the first fuel cell stack relative to the vehicle body is substantially equal to that of the second fuel cell stack.

12. The fuel cell system according to claim 10, wherein the first fuel cell stack and the second fuel cell stack are installed on a vehicle body of the vehicle, such that an angle of the discharge direction of the first fuel cell stack relative to the vehicle body is different from that of the second fuel cell stack.

13. The fuel cell system according to claim 1, wherein:

an angle of the discharge direction of the one fuel cell stack relative to the vertical downward direction is larger than 0 degrees, and is equal to or smaller than 180 degrees; and an angle of the discharge direction of the other fuel cell stack relative to the vertical downward direction is larger than 0 degrees, and is equal to or smaller than 180 degrees.

* * * * *